United States Patent [19]
Gasparri, Jr.

[11] Patent Number: 4,497,066
[45] Date of Patent: Jan. 29, 1985

[54] VIDEO DATA ACQUISITION SYSTEM

[75] Inventor: Alfred Gasparri, Jr., Austin, Tex.

[73] Assignee: Texas Instruments Incorporated, Dallas, Tex.

[21] Appl. No.: 355,287

[22] Filed: Mar. 5, 1982

[51] Int. Cl.³ .............................................. G06K 9/32
[52] U.S. Cl. .................................... 382/48; 358/107; 377/3; 382/18
[58] Field of Search ...................... 382/28, 18, 62, 44, 382/51, 48; 358/101, 107, 93; 340/722; 364/559–563, 715; 377/3

[56] References Cited
U.S. PATENT DOCUMENTS

| | | | |
|---|---|---|---|
| 2,919,426 | 12/1959 | Rohland | 382/62 |
| 3,803,553 | 4/1974 | Nakano | 382/28 |
| 4,164,728 | 8/1979 | Marsh | 382/44 |

Primary Examiner—Leo H. Boudreau
Attorney, Agent, or Firm—Thomas G. Devine; Leo N. Heiting; Melvin Sharp

[57] ABSTRACT

A video data acquisition system has a video camera for taking pictures of articles and from the picture image digitizes and selects signals within a predetermined amplitude range as representations of pixels of the picture image. A combination of horizontal, vertical and diagonal pixel collection circuitry acquires, in real time, the pixel counts necessary to establish the identity and orientation of the article represented by the image.

31 Claims, 27 Drawing Figures

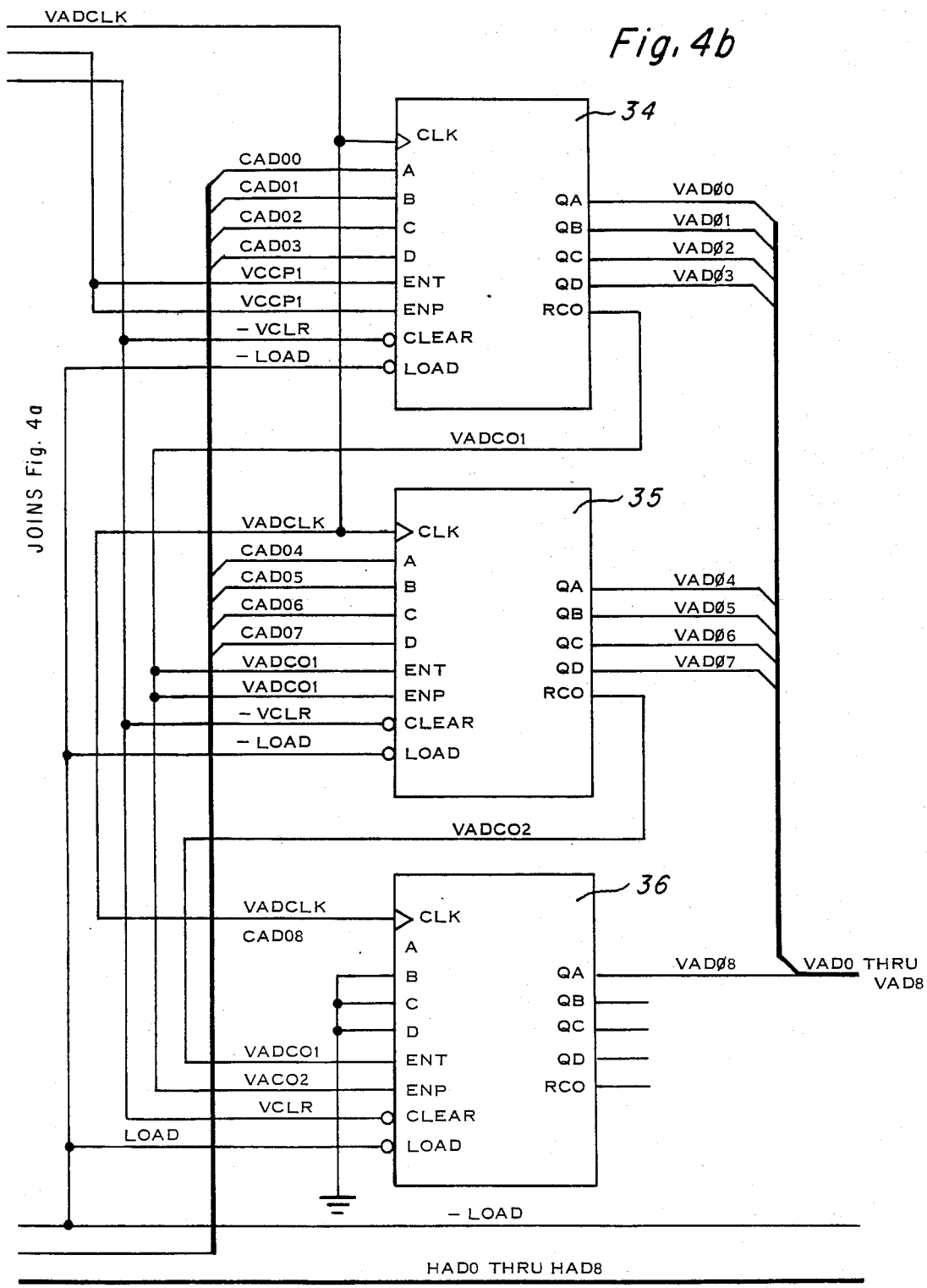

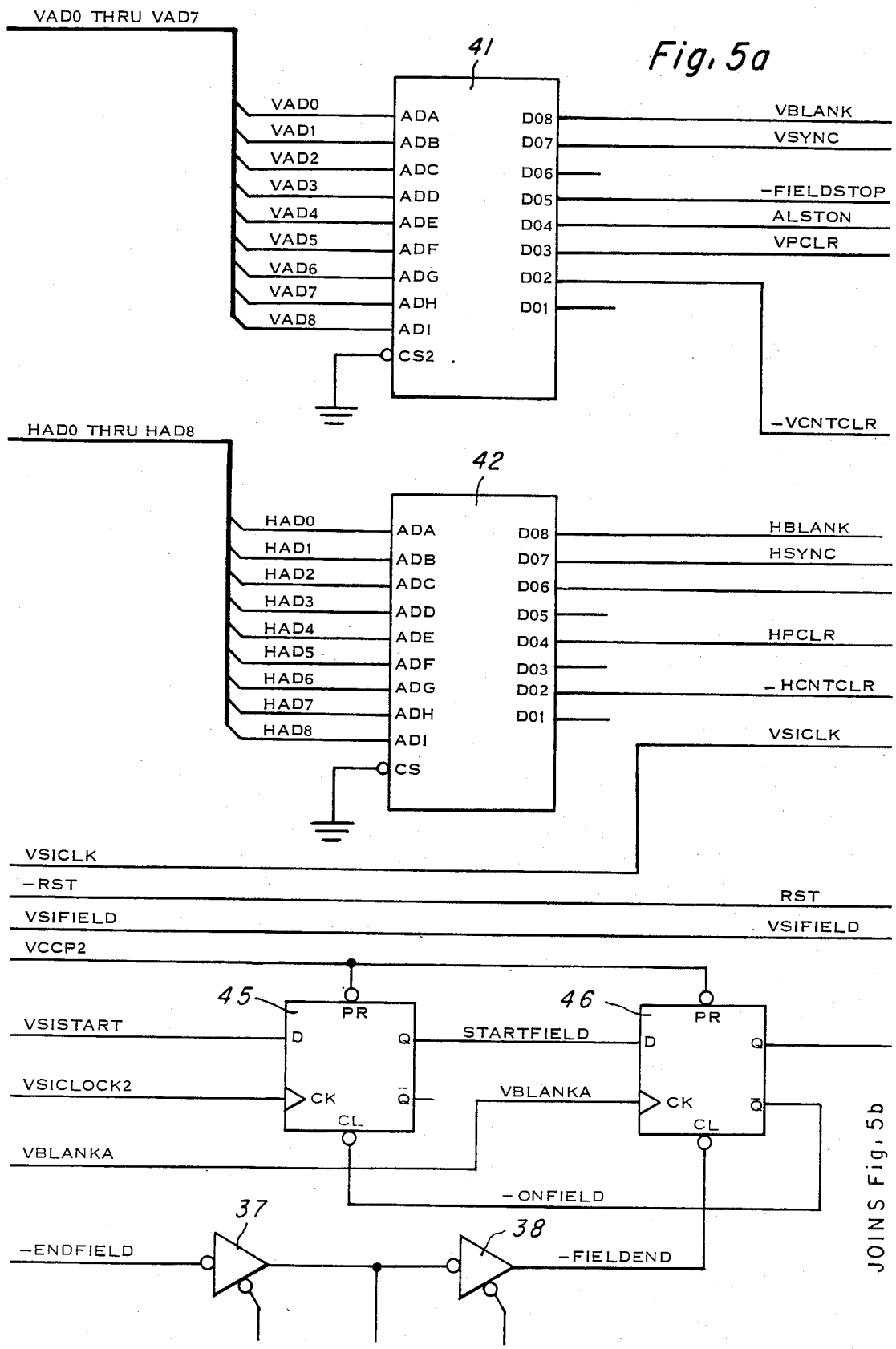

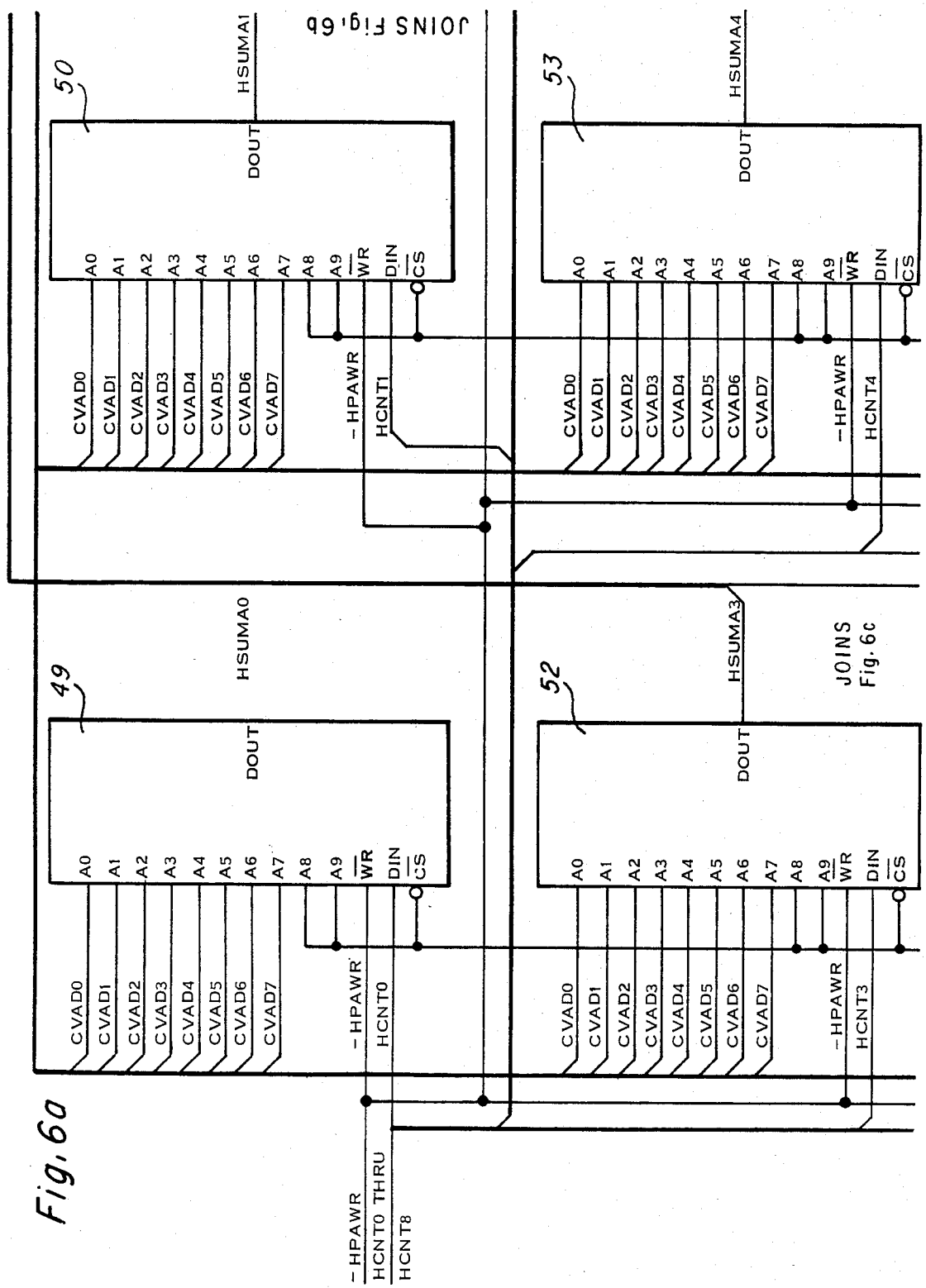

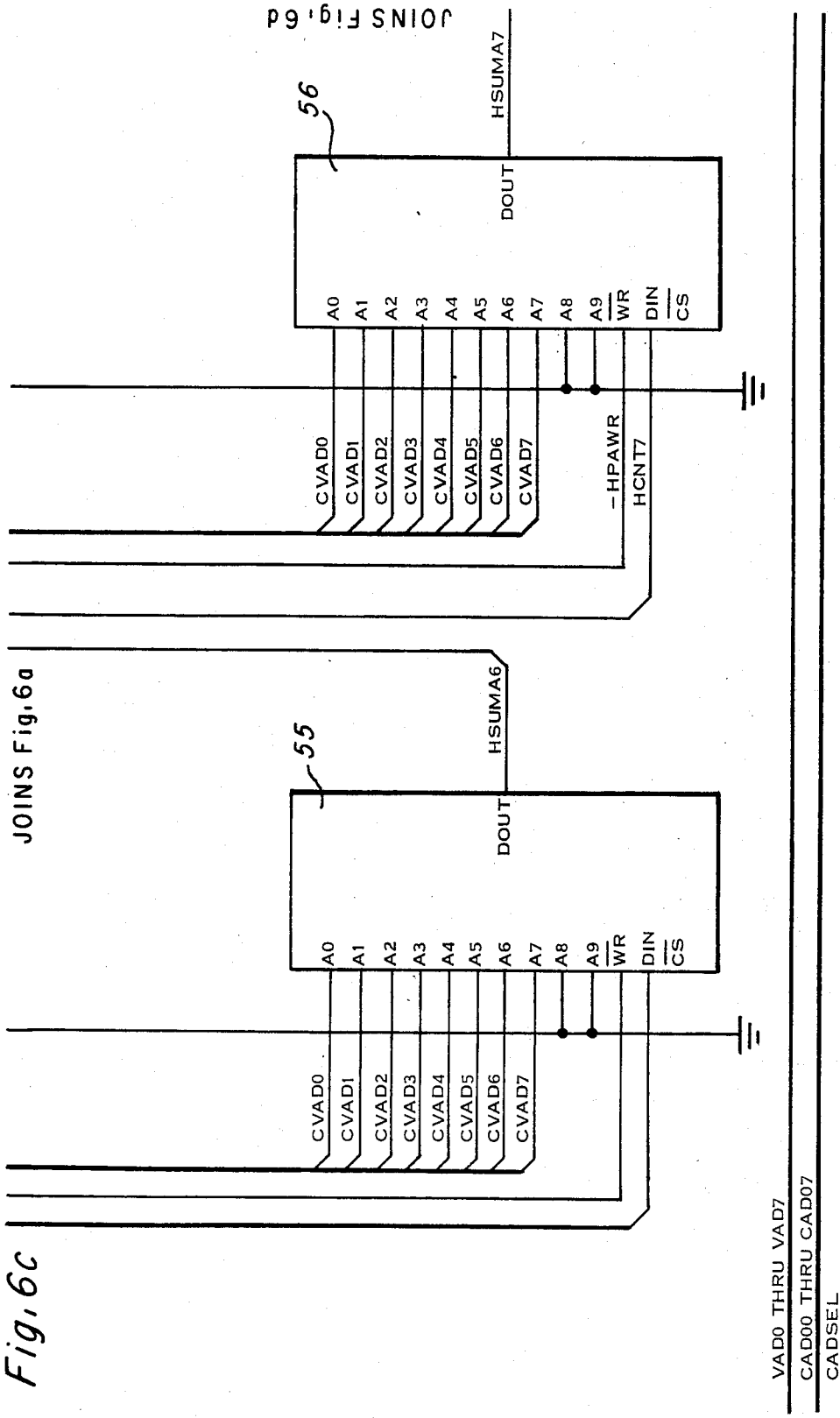

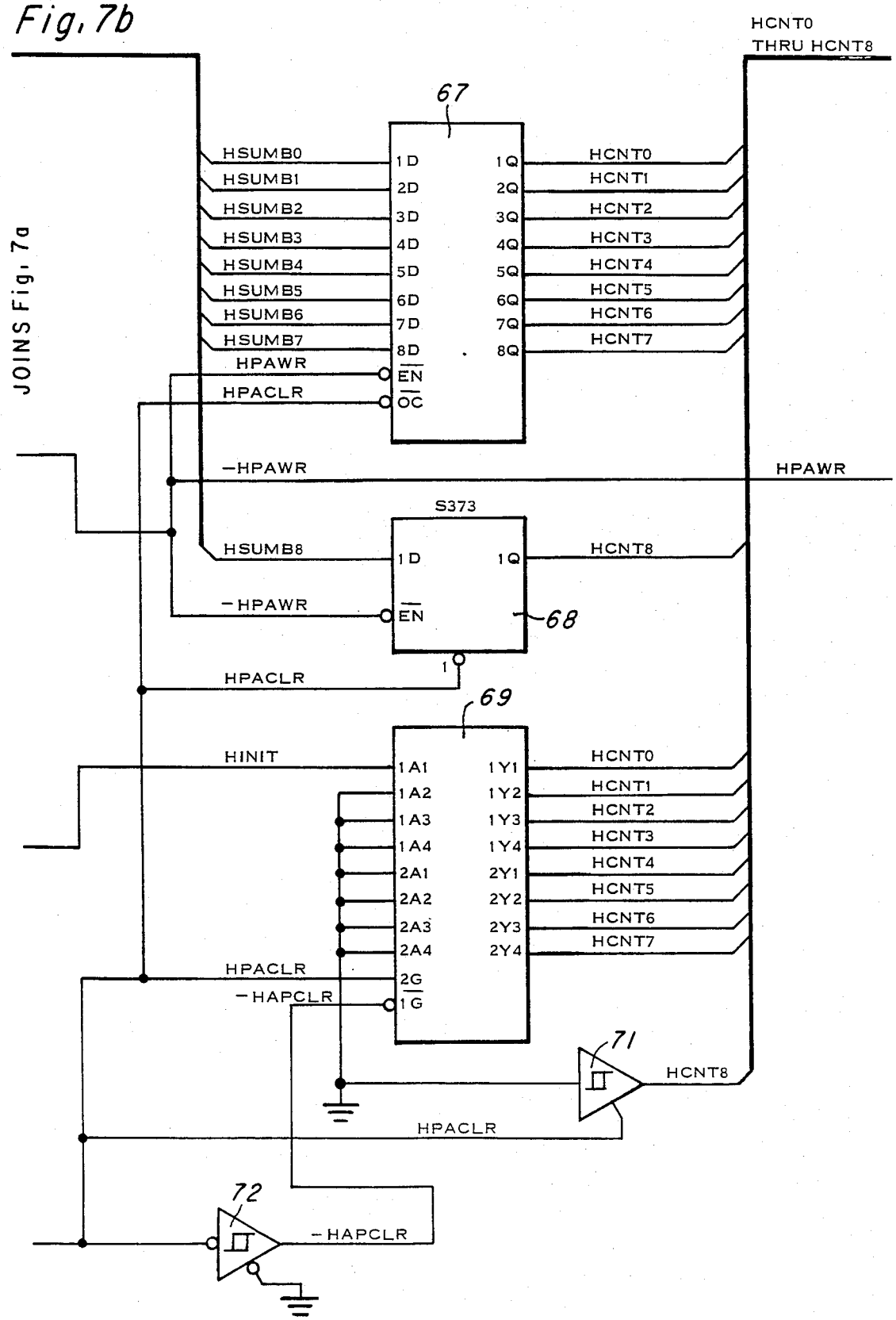

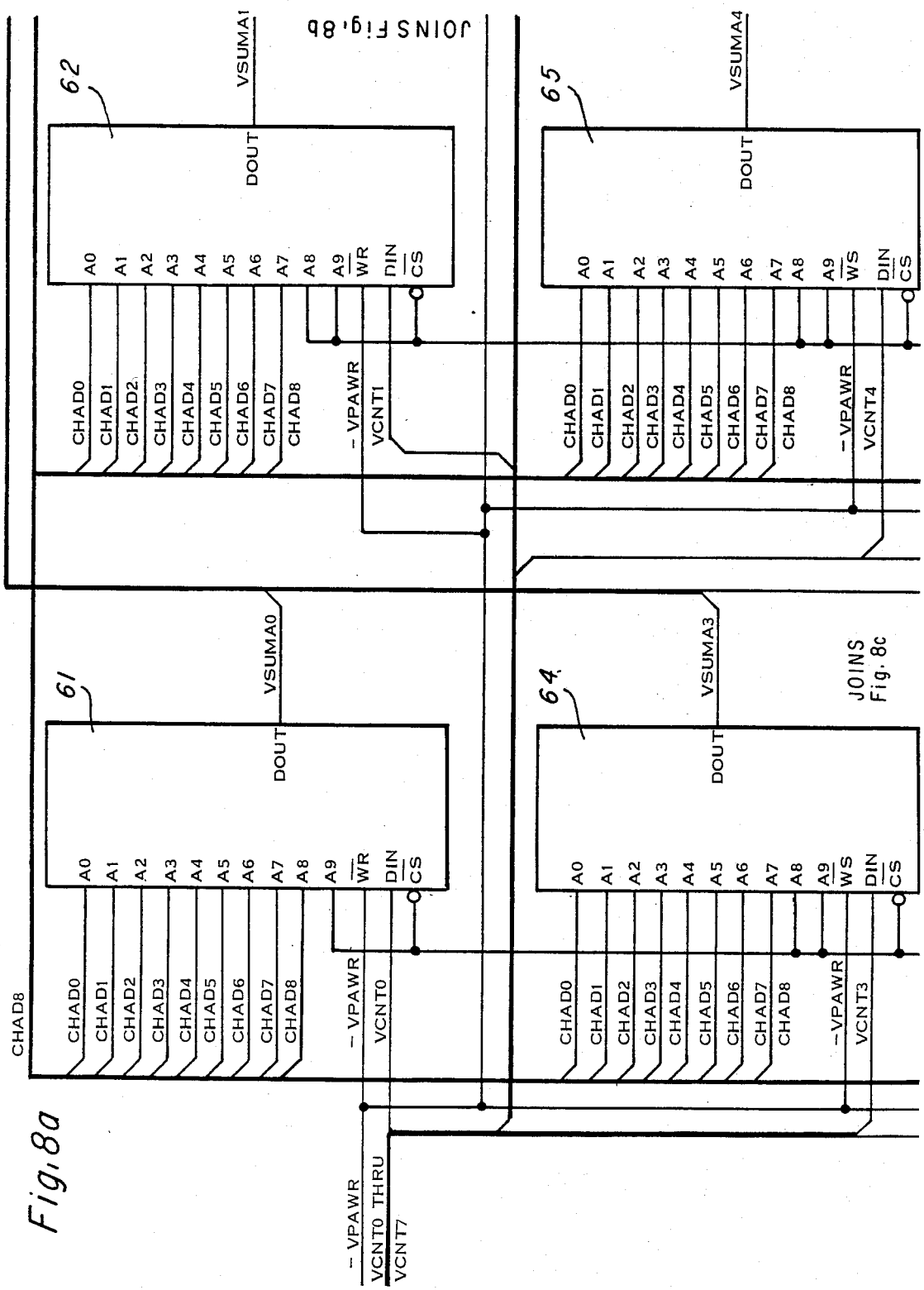

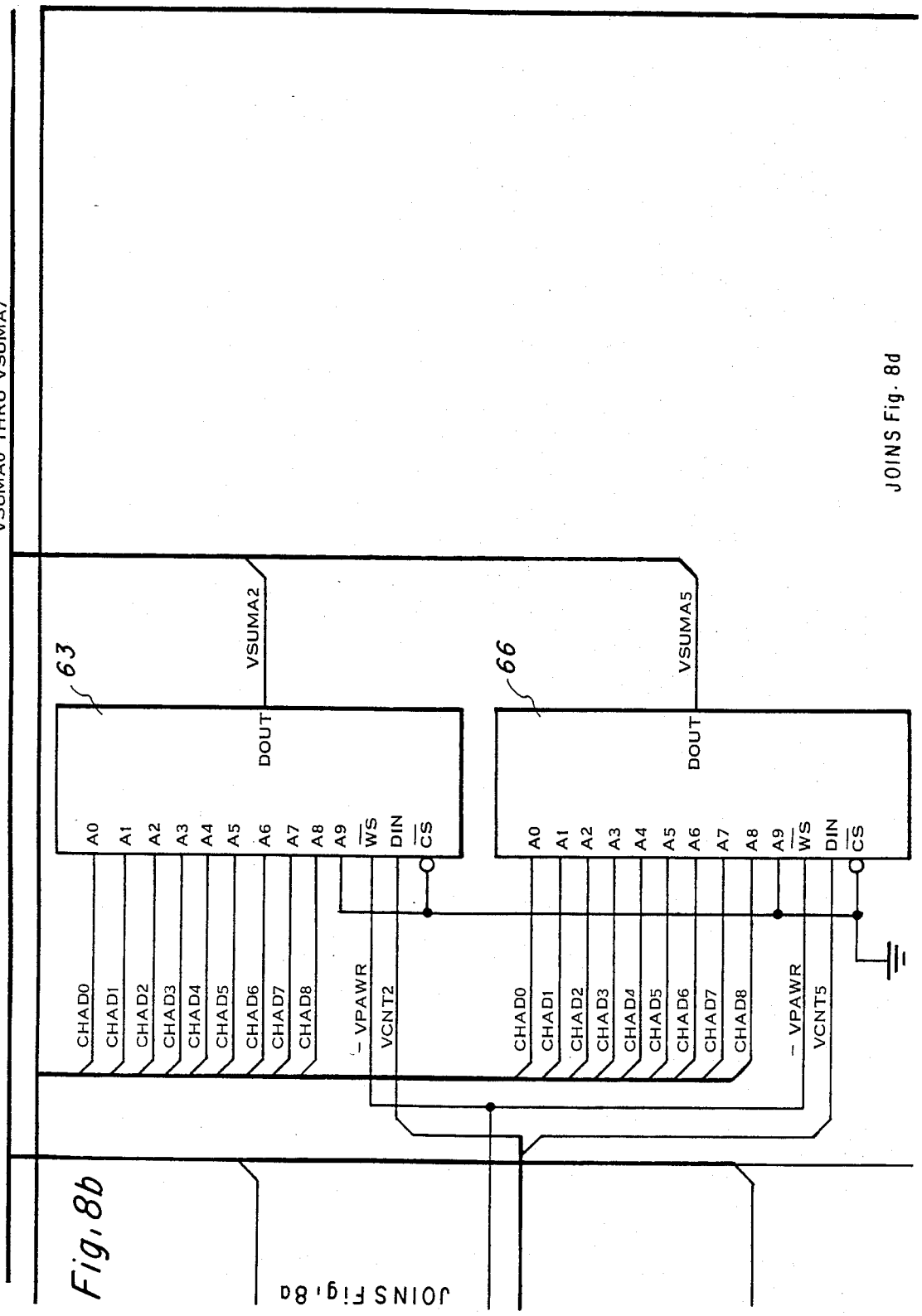

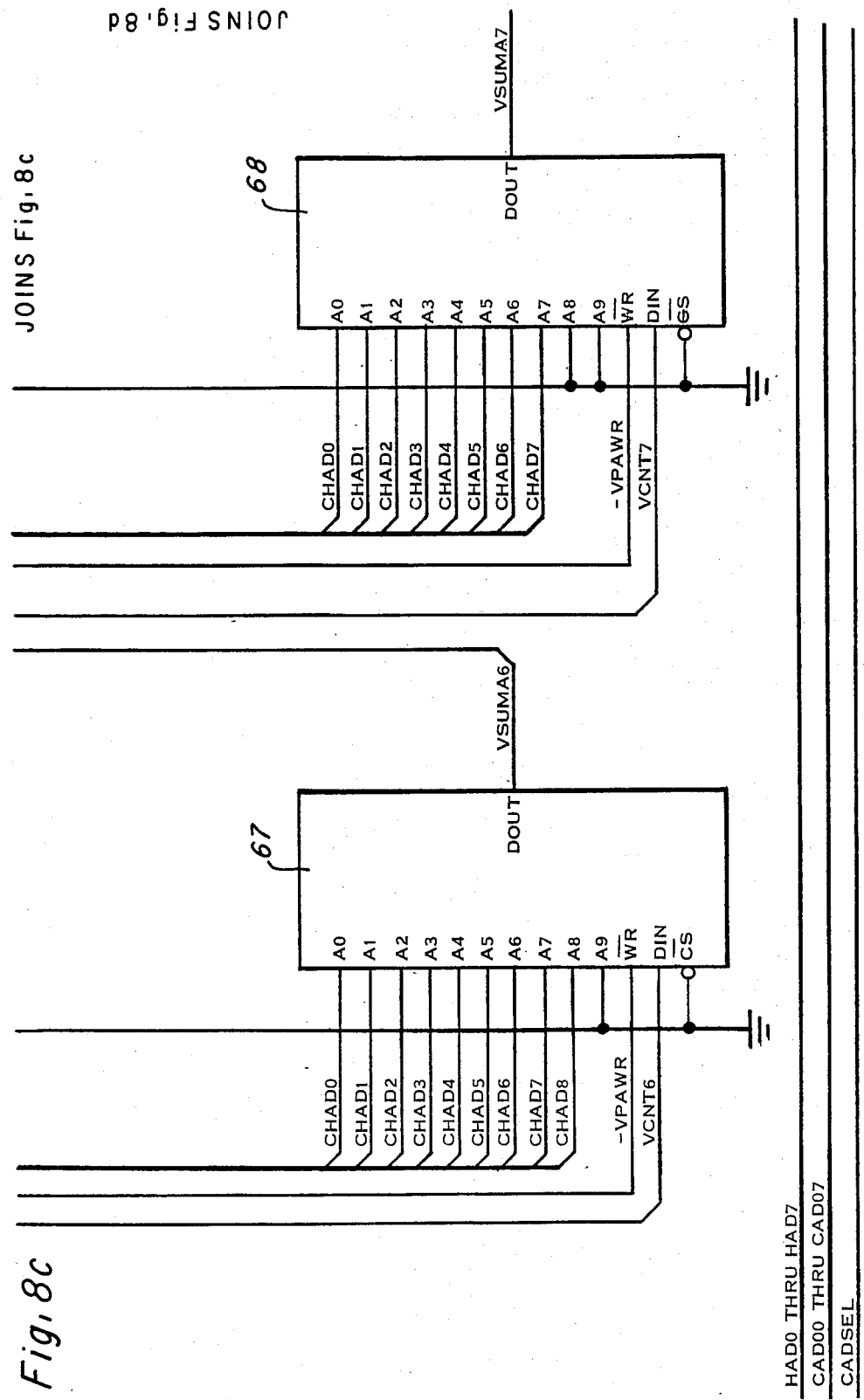

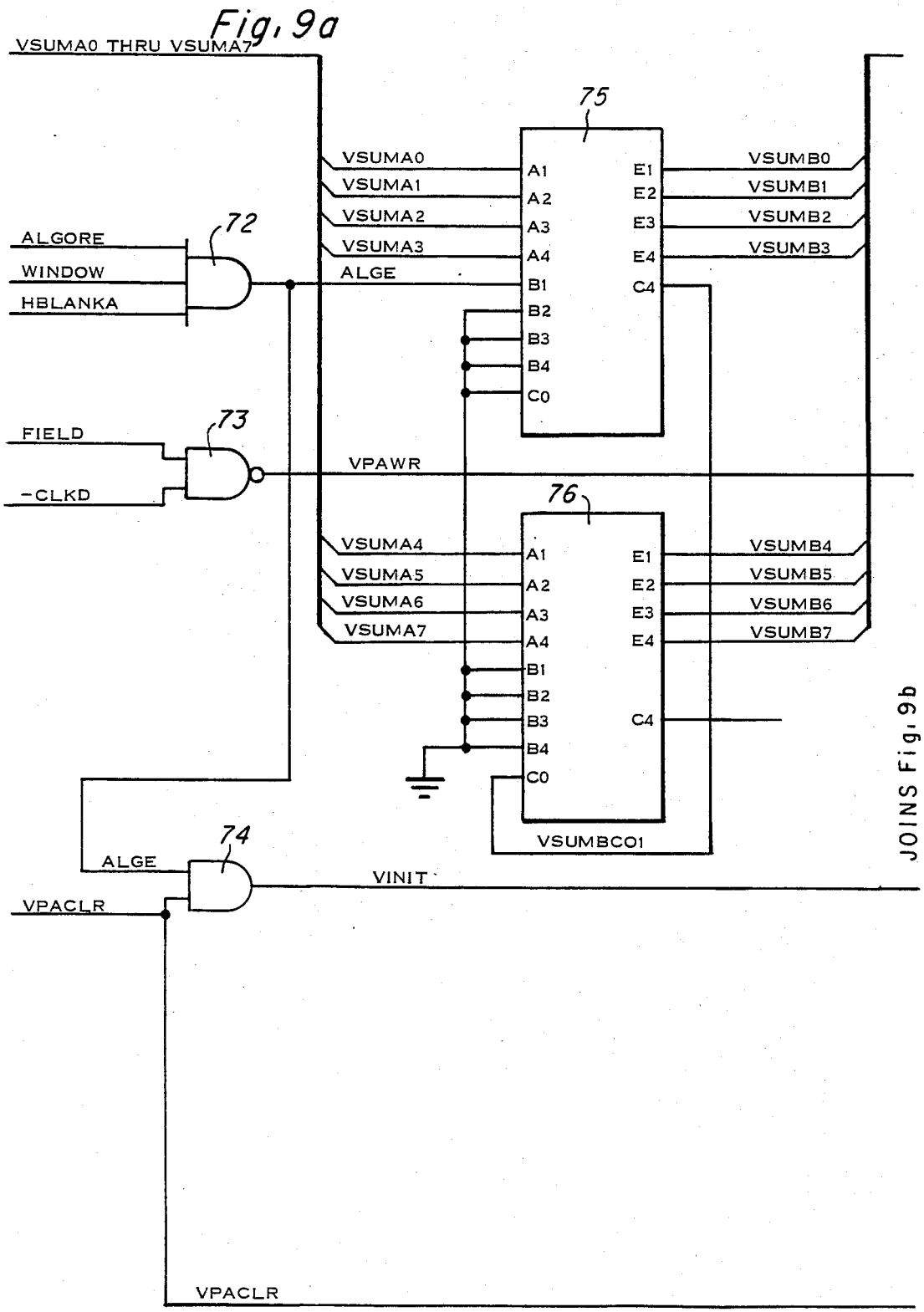

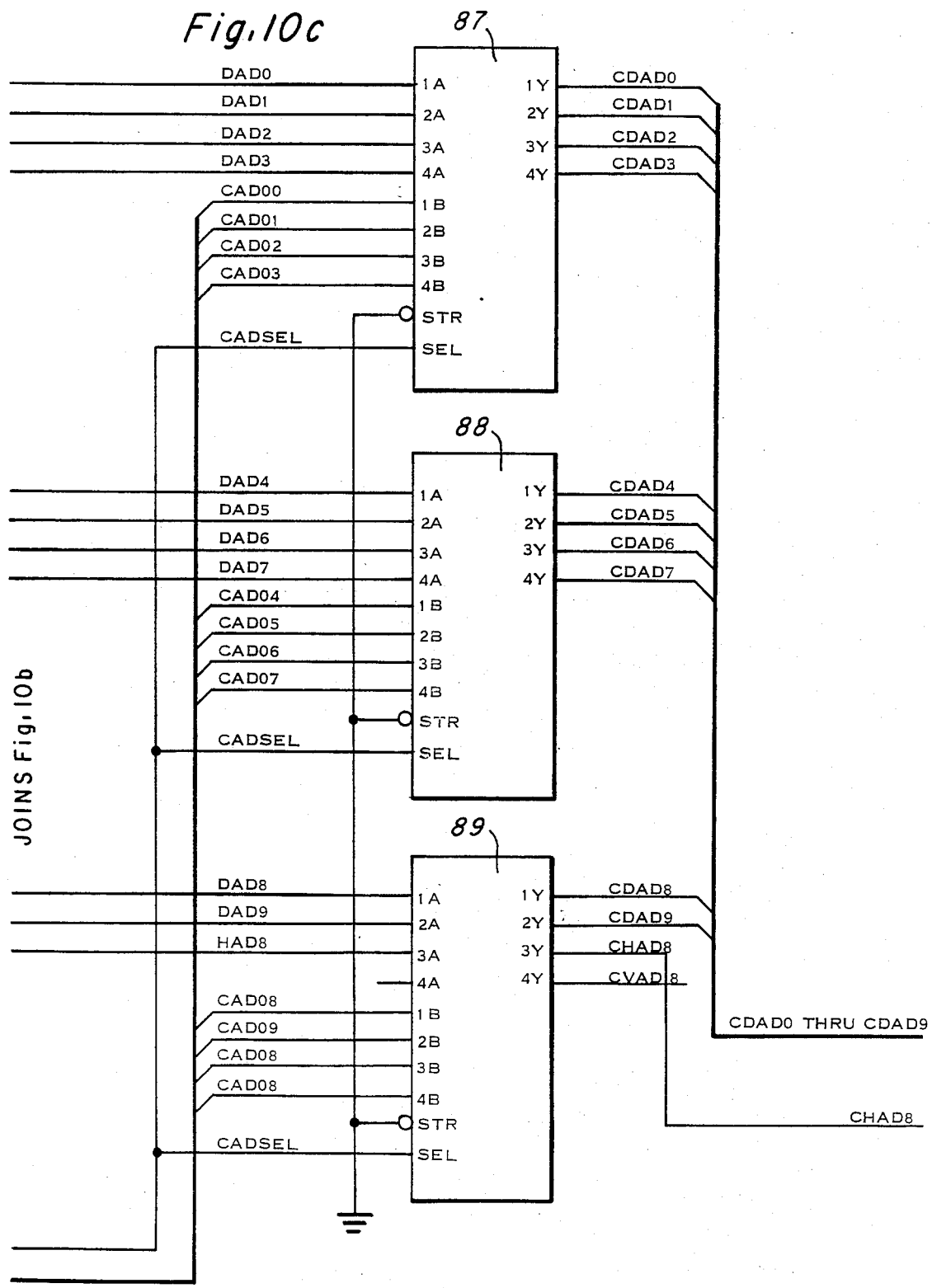

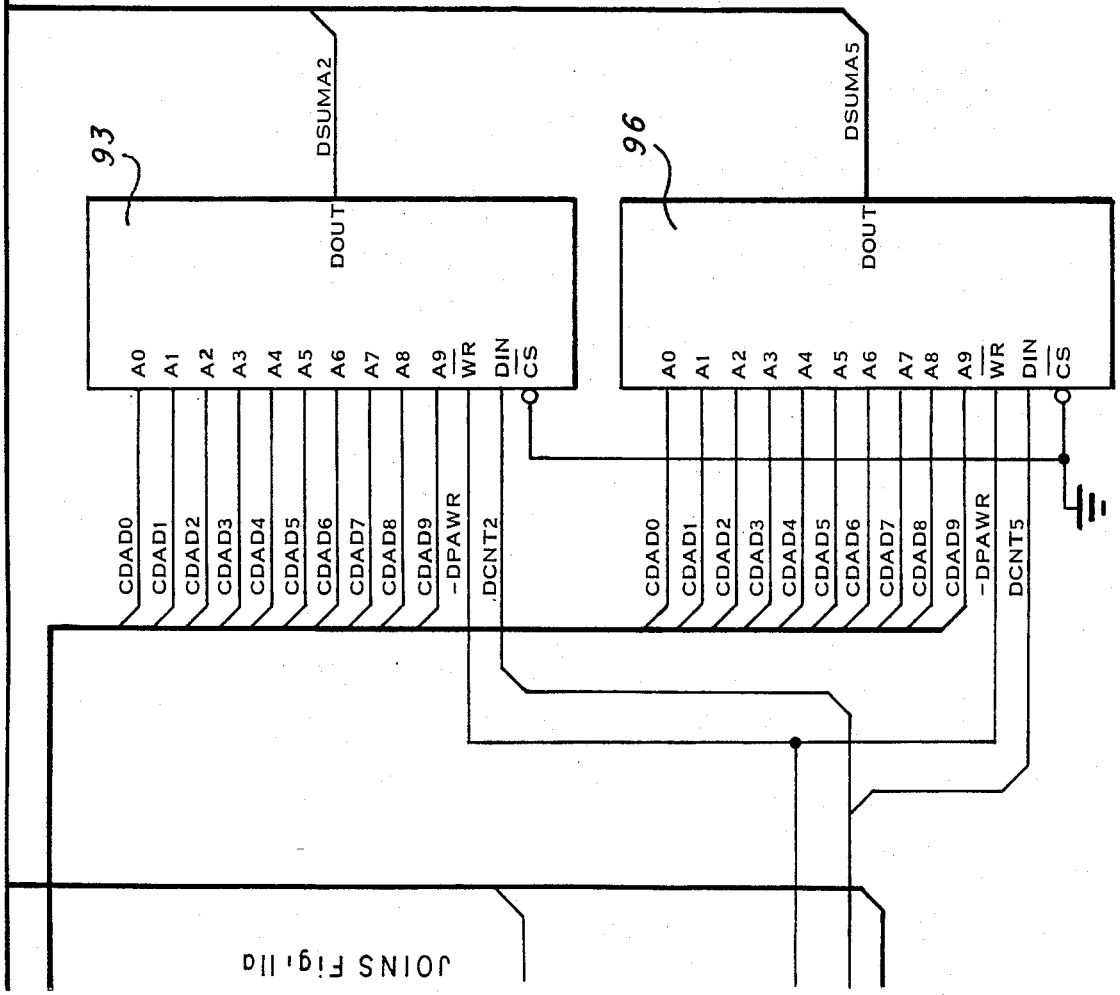

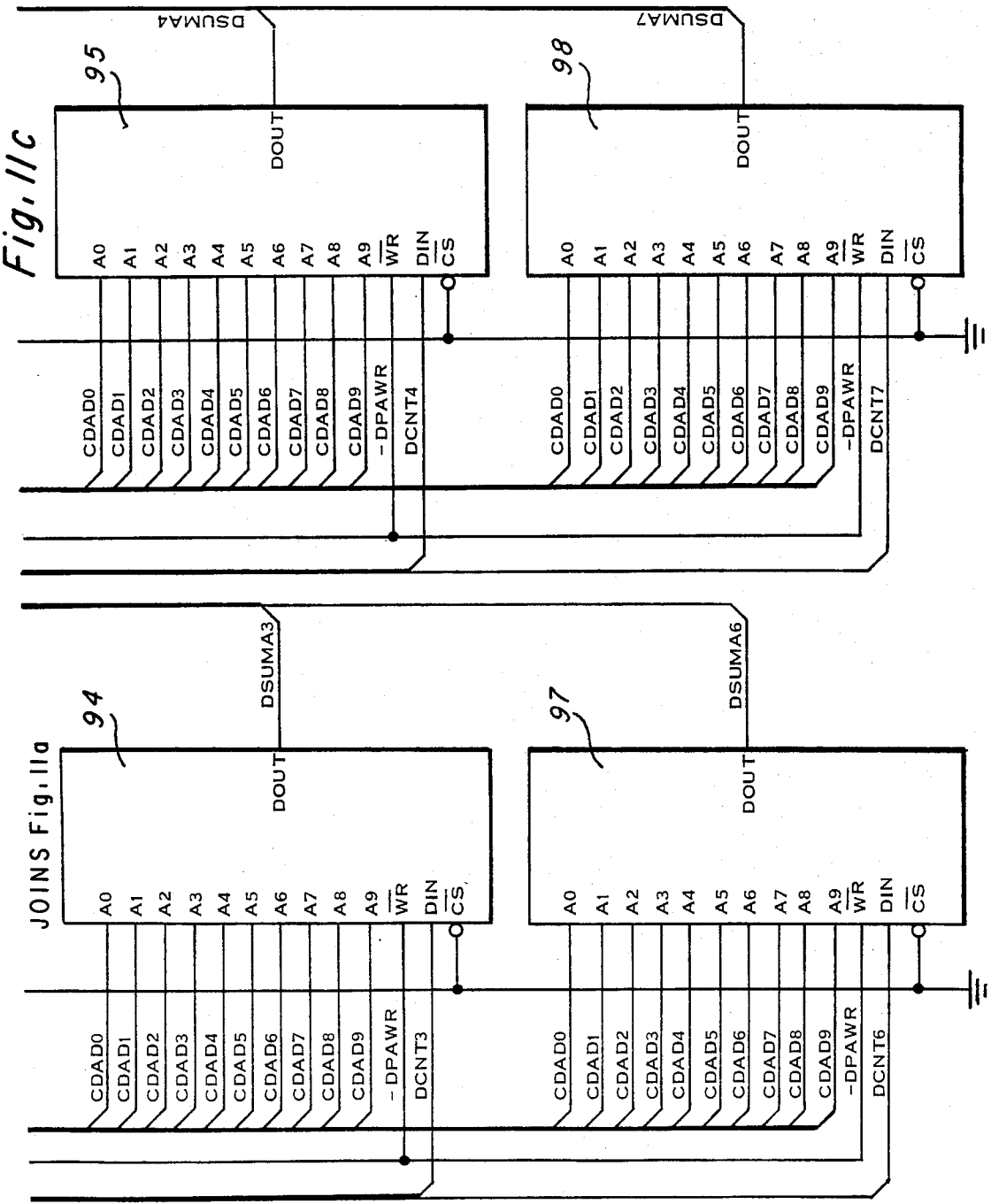

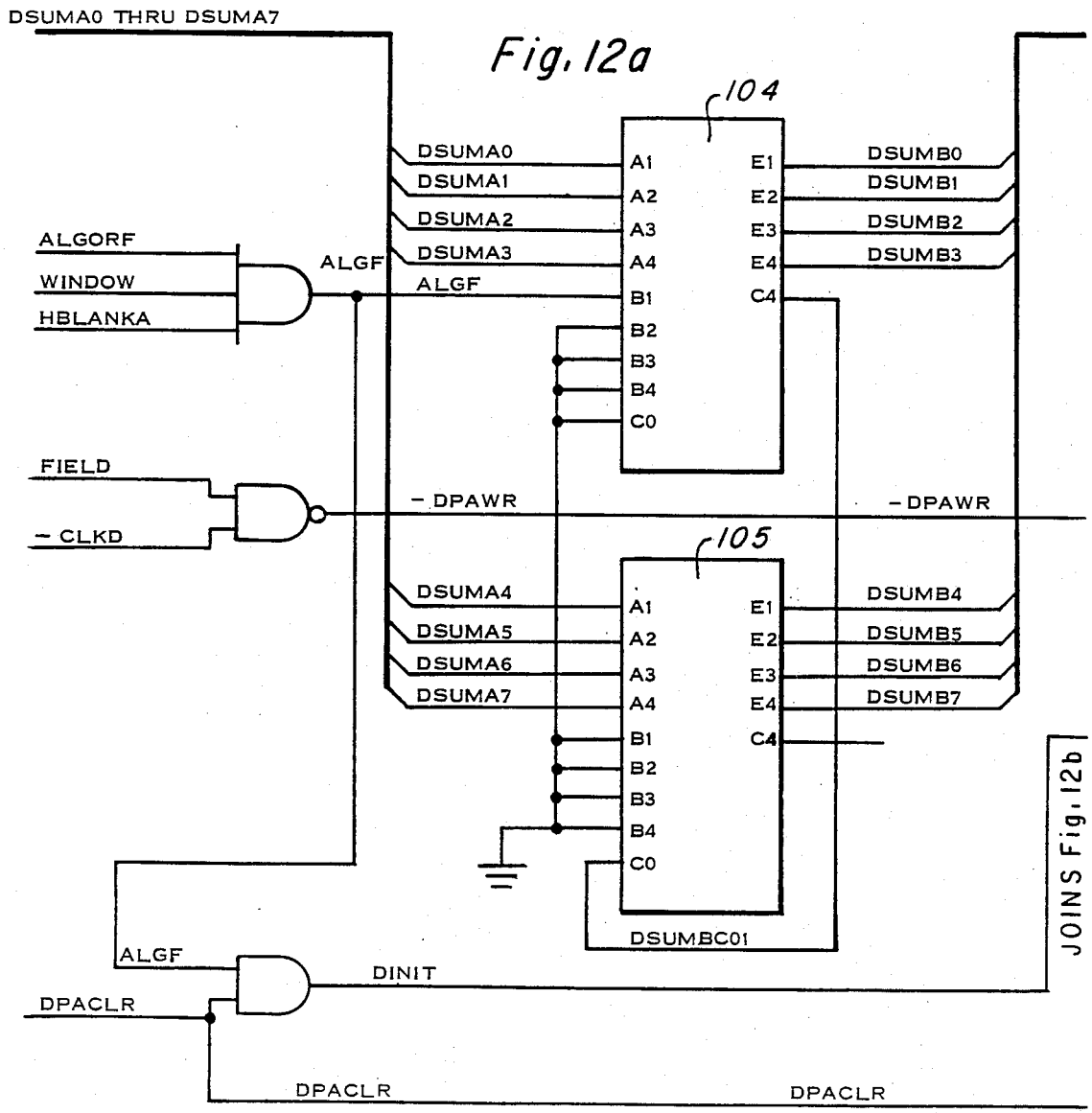

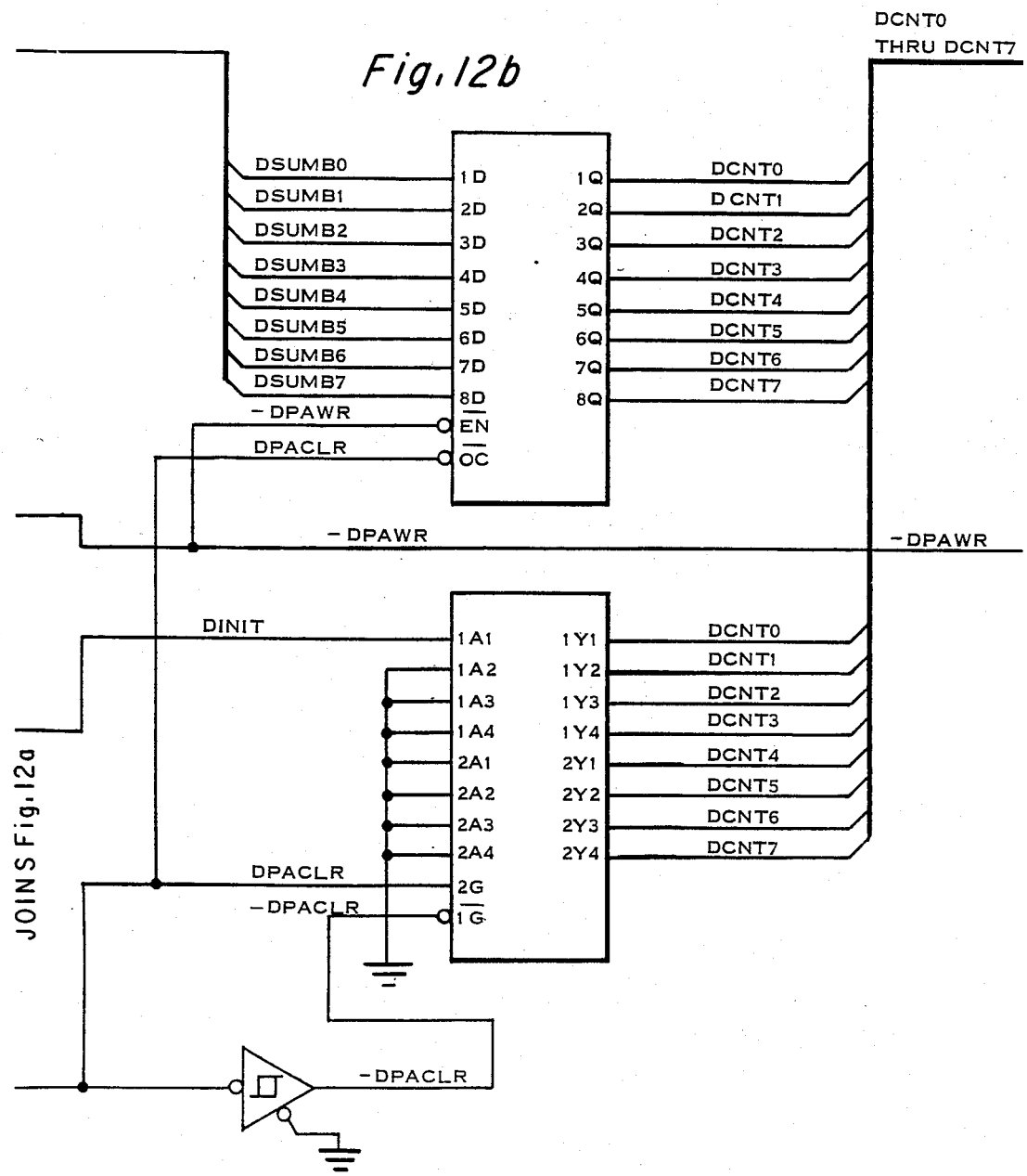

VIDEO DATA ACQUISITION SYSTEM

BACKGROUND OF THE INVENTION

1. Field of the Invention

This invention relates to a video data acquisition system and more particularly to a video data acquisition system that is capable of identifying an article and its orientation.

2. Description of the Prior Art

Typically, in the prior art, a representation of the video image was stored in the memory of a digital computer. The horizontal projection counts of the image pixels, the vertical projection counts and the diagonal projection counts are accumulated through manipulation of the video image data in the computer memory. Once acquired, the data is then used to calculate the location and orientation of the article. This procedure is time consuming.

To reduce this problem, other prior art systems have counted the horizontal and vertical projection pixels, leaving only the diagonal pixels to be calculated from the video image stored in the computer. While certainly an improvement over the prior art discussed above, lengthy computations are still necessary in this prior art technique.

BRIEF SUMMARY OF THE INVENTION

This invention solves the problem of lengthy computations required to determine the location and orientation of an article represented by a two-dimensional video image. This is accomplished by hardware counters which accumulate a count of pixels. These counts are gathered for vertical, horizontal and diagonal projections of the image. The counts are accumulated as the video image is acquired. With the hardware accumulation of all of this data, the calculations required are greatly simplified.

The output of the video camera is a serial stream of data that is digitized and selected as being a pixel of the image by determining whether the digitized signal falls within (or without) a given range. The pixels are counted in real time, in the rows and columns of the image as well as in the diagonal lines. The counting in the horizontal and vertical dimensions is straightforward by simply providing the system with a starting count, and permitting the counters to address random access memories so that at a corresponding address, the sum total of pixels in a given row, column or diagonal line is maintained. Clearing of the information at a given memory location is accomplished when that particular row, column or diagonal line is to have its number of pixels totaled.

Because the first data available is in the upper left-hand corner of the picture, the diagonal lines must be accessed starting at some value corresponding to the diagonal line that intersects the upper left-hand corner. As each row of pixels is completed, the original count or address for the diagonal line is decreased by one. In this manner, the need for negative binary numbers is eliminated.

The principal object of this invention is to provide pixel counts in the horizontal, vertical and diagonal directions to preclude the necessity for subsequent processing of a stored image.

Still another object of this invention is to provide pixel counts in the horizontal, vertical and diagonal directions in real time.

Another object of this invention is to provide data, in real time, enabling the determination of identity of an article and its orientation.

These and other objects will be made obvious in the detailed description that follows.

BRIEF DESCRIPTION OF THE DRAWINGS

FIGS. 4a and 4b illustrate the horizontal and vertical address generators of this invention.

FIGS. 5a and 5b schematically illustrate the development of video control signals.

FIGS. 6a–6d form a schematic diagram of the horizontal pixel accumulator memory.

FIGS. 7a and 7b together form a schematic diagram of the horizontal pixel accumulator sum and initialization circuitry.

FIGS. 8a–8d form a schematic diagram of the vertical pixel accumulator memory.

FIGS. 9a and 9b form a schematic diagram of the vertical pixel accumulator sum and initialization circuitry.

FIGS. 10a–10c form a schematic diagram of the diagonal address generator circuitry.

FIGS. 11a–11c form a schematic diagram of the diagonal pixel accumulator memory.

FIGS. 12a and 12b form a schematic diagram of the diagonal pixel accumulator sum and initialization circuitry.

DETAILED DESCRIPTION

In accordance with this invention, circuitry is provided for the accumulation of diagonal pixel counts of the image of an article at video rates. These counts are made at the same time that an accumulation of horizontal pixels (rows) and vertical pixels (columns) are made. These counts are useful for the identification and determination of orientation of the article. The calculations required of a digital computer to determine the identity and orientation of the article are greatly simplified.

Figure 1:
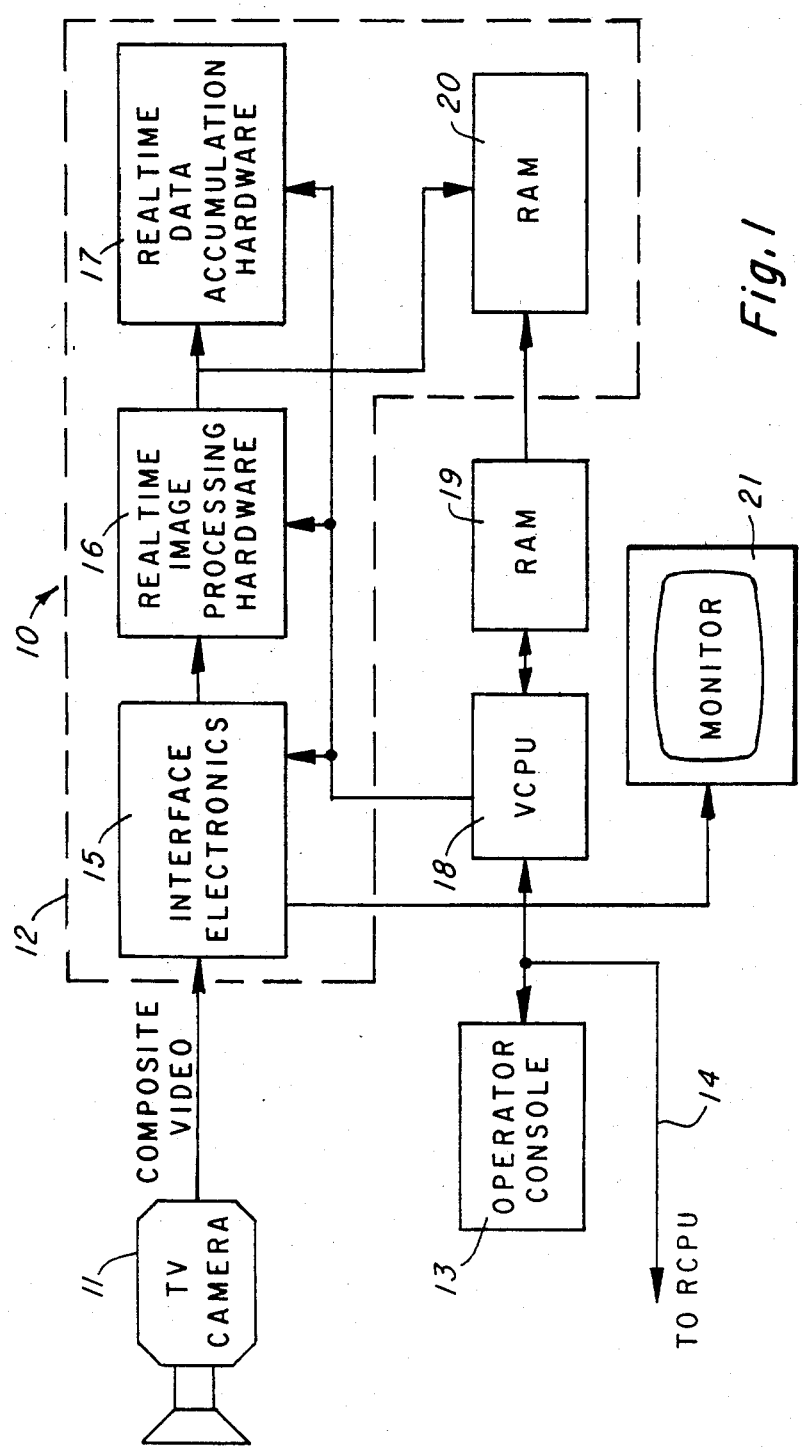
FIG. 1 is a block diagram of a video data collection system that utilizes this invention.

FIG. 1 illustrates a video acquisition system 10 having a TV (video) camera 11 which provides vision system interface (VSI) board 12 with a composite video signal. In this preferred embodiment, an Hitachi KP-120 solid state TV camera is employed. Interface electronics 15 on VSI board 12 receives the composite video and provides a digitized output. Also, digitized signals are compared to a given range of amplitude to determine whether the pixel corresponds to a white background or to a dark article or object. This is an arbitrary designation so that, for example, a binary "1" may correspond to the dark article while a binary "0" may correspond to a white background. This digitizing and threshold setting is well known in the art.

Real time image processing hardware 16 of VSI board 12 provides the system with an ability to measure article perimeters and areas, and to recognize edges, leading or following.

Real-time data accumulation hardware 17 of VSI board 12 receives the signal train from hardware 16 and encompasses the hardware required for horizontal, vertical and diagonal collection of image bits (pixels) and represents the invention herein described.

Random access memory (RAM) 20 of VSI board 12, which is connected to units 16 and 17, is available for storage of the image of the article.

Video central processing unit (VCPU) 18, together with RAM 19, provide computing capability for controlling the video acquisition system. In this preferred embodiment, VCPU 18 is a Texas Instruments Incorporated type 990/5 microcomputer. VCPU 18 and RAM 19 are connected to units 15-17 and RAM 20.

Monitor 21, which is connected to all of the elements on VSI board 12, to the VCPU 18 and to RAM 19 is available for viewing the picture taken by the TV camera 11.

Operator console 13 may be used to input VCPU 18 for desired operations. Output 14 from operator console 13 in VCPU 18 may be connected to a robot central processing unit (RCPU) to provide a visual robot system.

Figure 2:
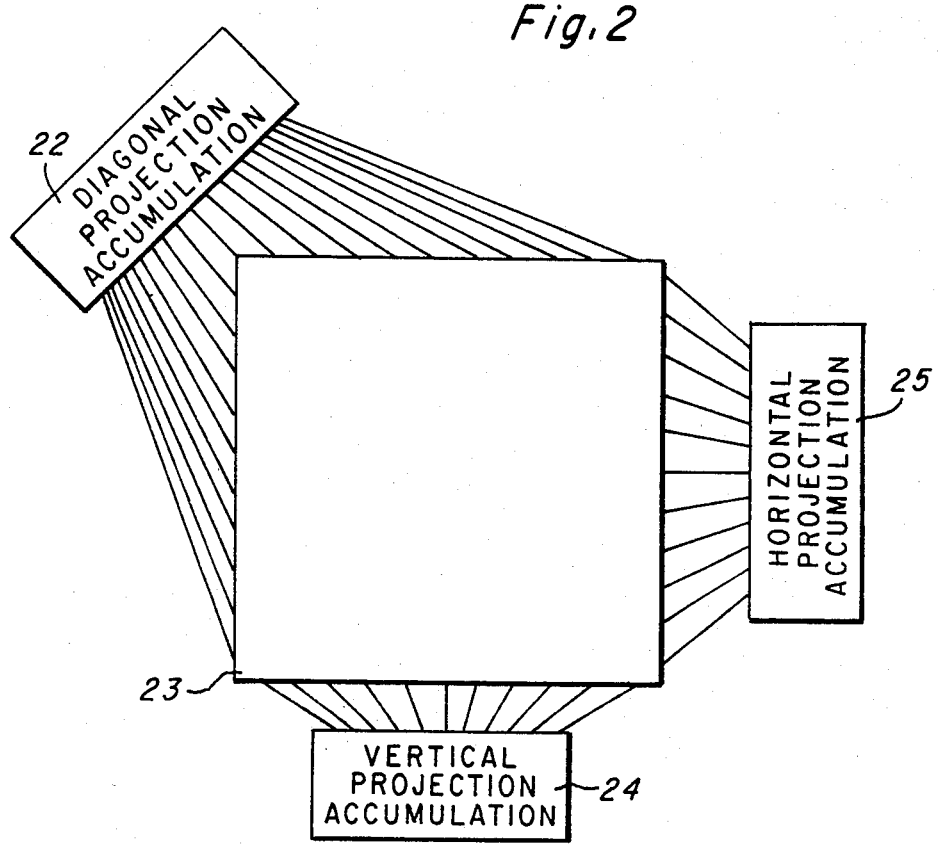
FIG. 2 schematically illustrates pixel collection.

FIG. 2 illustrates diagonal projection accumulation circuitry 22, vertical projection accumulation circuitry 24 and horizontal projection accumulation circuitry 25 all connected to Frame 23 which illustrates the picture taken by the TV camera 11 of FIG. 1.

Figure 3:
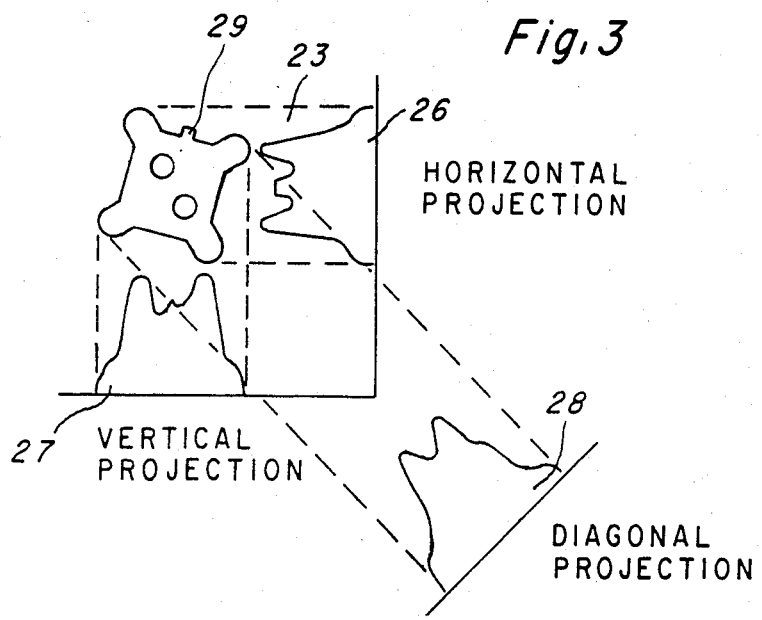
FIG. 3 illustrates an article together with its horizontal, vertical and diagonal projection pixel counts.

FIG. 3 illustrates an image of article 29 whose picture was taken by video camera 11. The vertical projection 27 of pixel counts is illustrated as is the horizontal projection 26. The essence of this invention is the combination of the vertical and horizontal projections with diagonal projection 28 of article 29. Having determined counts of these three projections, the task of identifying and orienting the article is greatly simplified as illustrated in copending U.S. patent application Ser. No. 355,285, filed on Mar. 5, 1982 and entitled "A Video Data Acquisition System and Hand-Held Application Module for Operation Thereof".

Figure 4A:
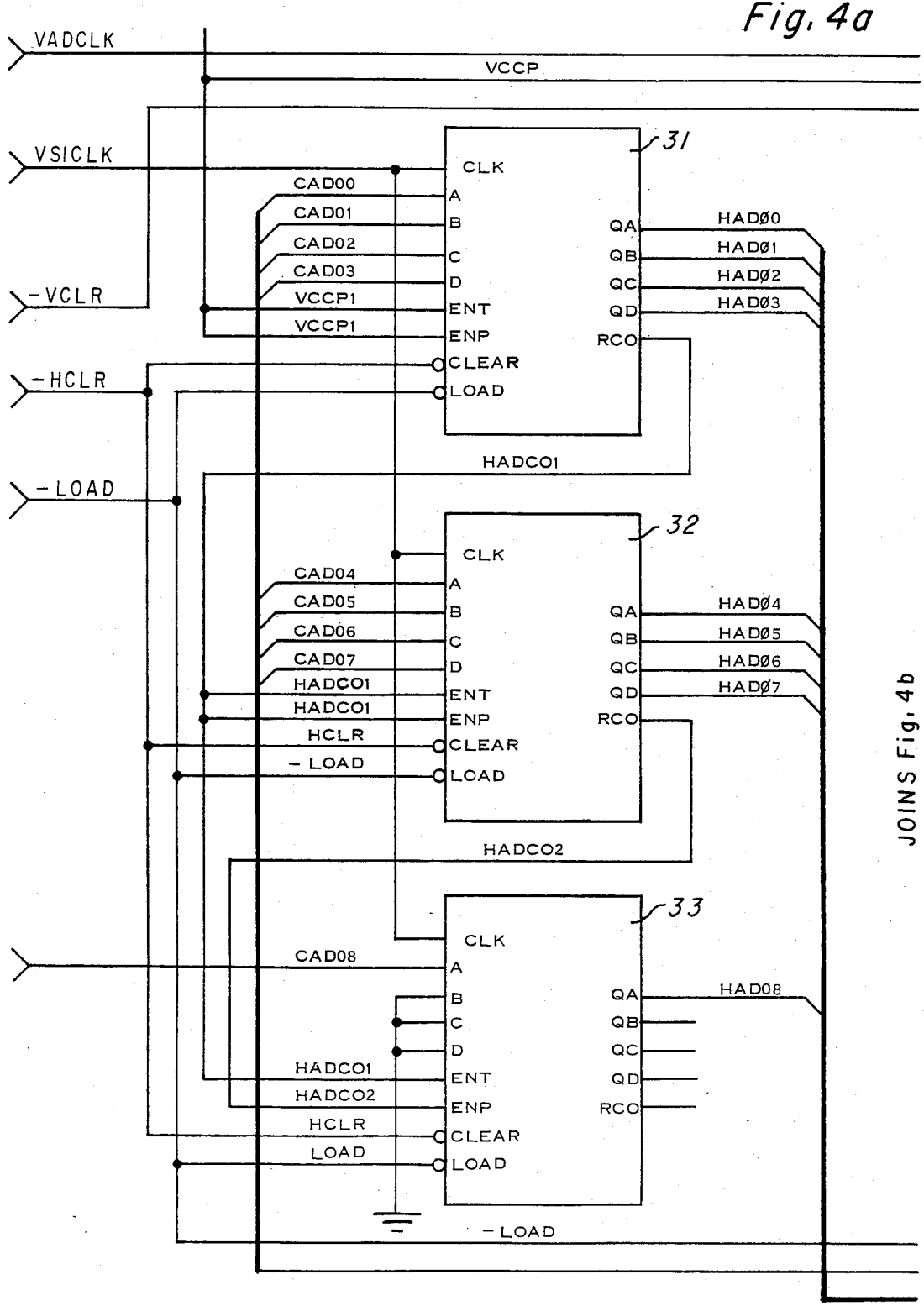

Turning now to FIGS. 4a and 4b, the horizontal and vertical address generators will be discussed. The horizontal address generators 31, 32 and 33 are, in this preferred embodiment, Texas Instruments Incorporated type SN74LS163A synchronous 4-bit counters which increment by one until they are cleared. Vertical address generators 34, 35 and 36 are identical to the horizontal address generators 31-33.

A system clock (not shown) provides the clock input to counters 31-33. Clock signal VADCLK provides the clock input for counters 34-36. The starting count of all of the counters is provided by VCPU 18 which addresses the counters through signals CAD00-CAD08. Counter 31 provides output signals HAD0-HAD3; counter 32 provides output signals HAD4-HAD7; counter 33 provides output signal HAD8. The output of counter 34 provides signals VAD0-VAD3; the output of counter 35 provides signals VAD4-VAD7; the output of counter 36 provides signal VAD8. Signal −VCLR is provided by and ing signal −VCNTCLR from FIG. 5b with signal −RST from VCPU 18 and provides the clear signal for the vertical address generators 34-36. Signal −HCLR, from VCPU 18 provides the horizontal clear signal for horizontal address generators 31-33. The −LOAD signal from VCPU 18 provides the load input to all of address generators 31-36.

Figure 5B:
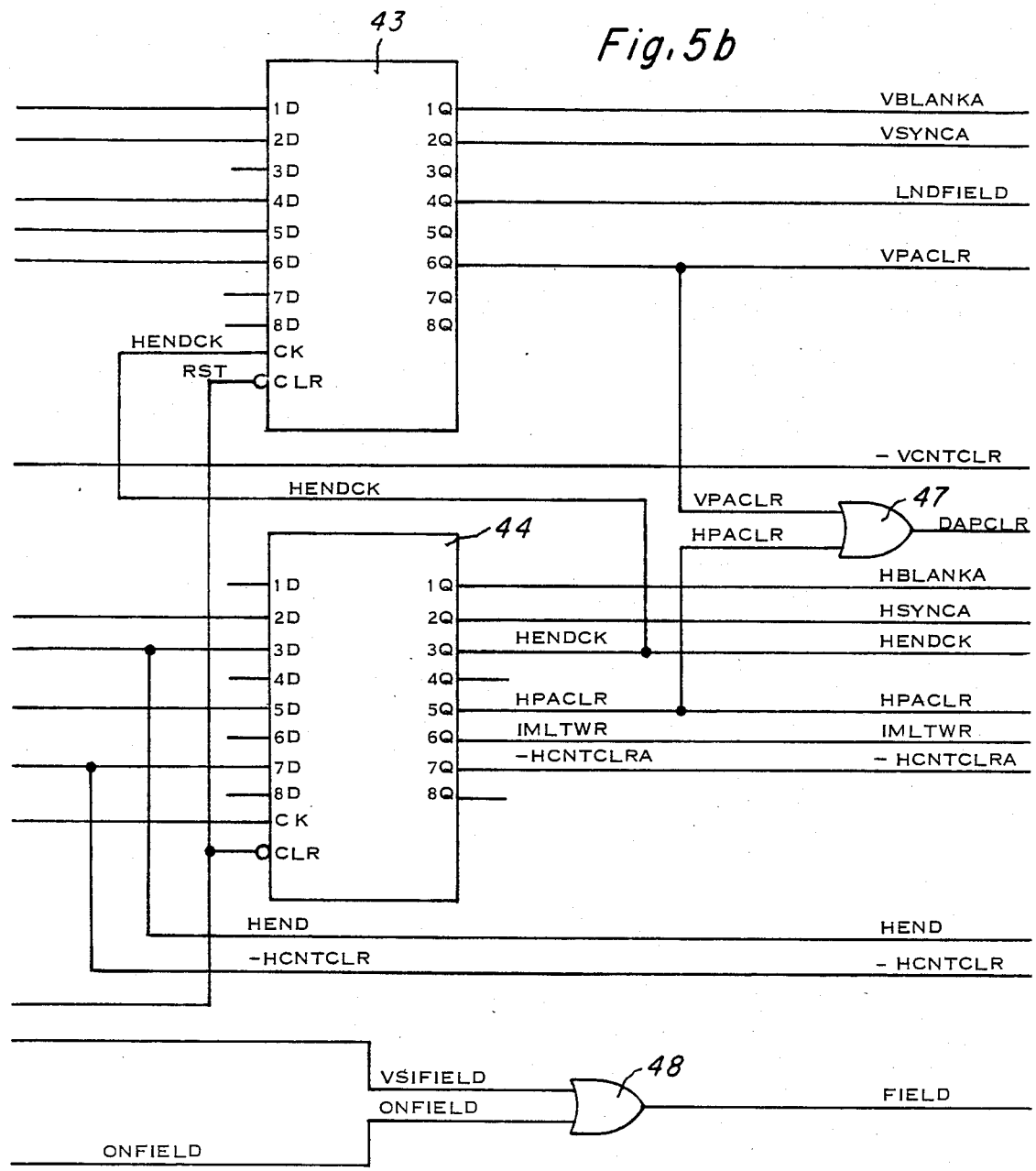
Figure 6B:
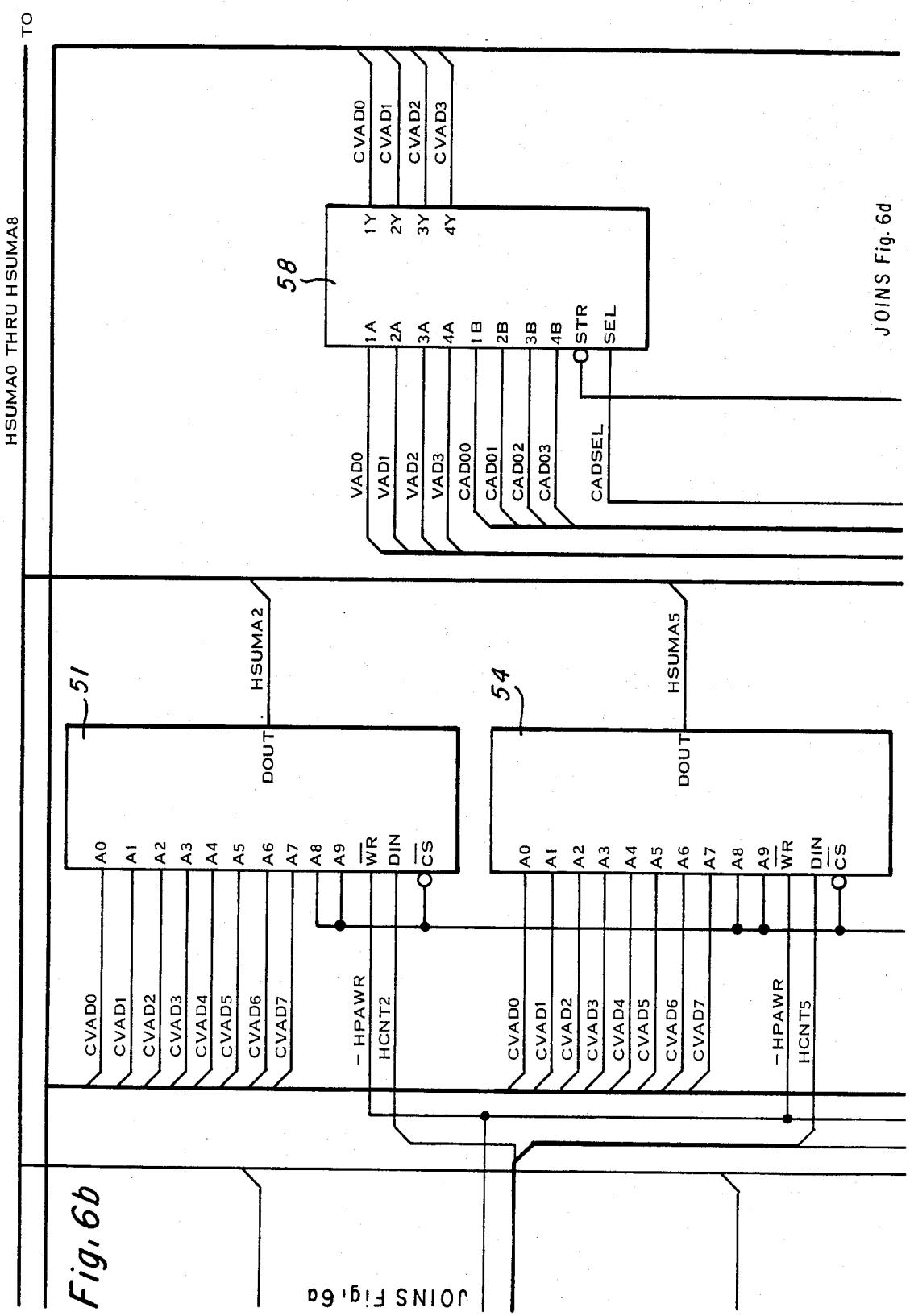
Figure 6D:
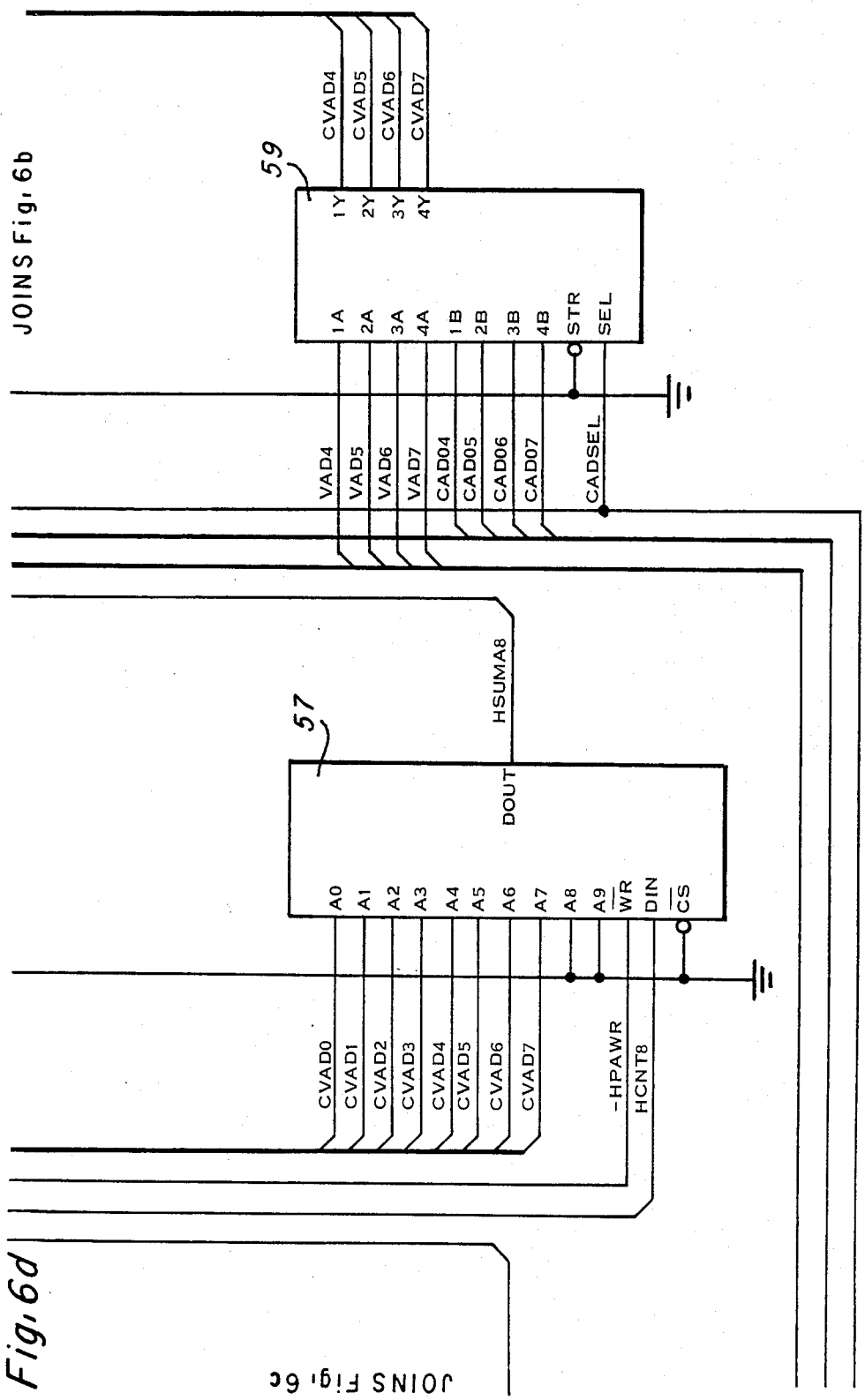

FIGS. 5a and 5b illustrate the video ROM control that provides various signals for controlling the operation of the pixel collection circuitry. Programmable read-only-memory (PROM) 41 receives signals VAD0-VAD8 from vertical address generators 34-36. PROM 42 receives signals HAD0-HAD8 from horizontal address generators 31-33. Output signals of interest from PROM 41 are signals VBLANK, VSYNC, −FIELDSTOP, VPCLR, all of which are input of octal flipflop circuit 43. PROM 41 provides another output signal −VCNTCLR, which is used in the control of the diagonal address generator, FIGS. 10a-10c, to be described later. The output from flipflops 43 provides signals VBLANKA, VSYNCA, −ENDFIELD and VPACLR.

PROM 42 has as inputs HAD0-HAD8 from address generators 31-33. The output signals of interest are HSYNC, HEND, HPCLR and −HCNTCLR all of which provide inputs to flipflops 44 which provide output signals HSYNCA, HENDCK, HPACLR and −HCNTCLRA.

Signal VSIFIELD is applied as one input to OR gate 48. Signal VSISTART, provided by VCPU 18 is applied to the input of flipflop 45 whose clock input is supplied by the signal VSICLOCK. The output flipflop 45 is applied to the D input of flipflop 46 whose clock input is provided by the signal VBLANKA, one output of flipflops 43. Flipflop 45 is cleared by the −Q output of flipflop 46. Flipflop 46 is cleared by signal −ENDFIELD, another output from flipflops 43 which is twice inverted by inverters 37 and 38. The output from flipflop 46 provides a second input to OR gate 48 which provides output signal FIELD for controlling the start of when the picture is taken.

FIGS. 5a and 5b illustrate the development of various of the control signals that will be used throughout the horizontal, vertical and diagonal pixel collection circuitry.

FIGS. 6a-6d illustrate 1K by 1 RAMS 49-57, each having as address inputs signals CVAD0-CVAD7. These signals are output from selectors 58 and 59. Selector 58 has as inputs signals VAD0-VAD3. Selector 59 has as inputs signals VAD4-VAD7. Additionally, selector 58 has input signals CAD00-CAD03 and selector 59 has as additional inputs CAD04-CAD07. These are VCPU 18 provided address inputs as indicated earlier. They are selected by signal CADSEL, also provided by VCPU 18 to enable transmission to VCPU 18. In this preferred embodiment, the 1K by 1 bit RAMS 49-57 are type 93425 manufactured by the Fairchild Company. The selectors 58 and 59 are Texas Instruments type SN74LS157. The −WR input to each of these RAMs is provided by signal −HPAWR which is the output of NAND gate 62 found in FIG. 7a having input signals FIELD from OR gate 48 and −CLKD which is VSICLK inverted. The outputs from RAMs 49-57 are HSUMA0-HSUMA8, respectively. The data in for each of RAMs 49-57 is provided by signals HCNT0-HCNT8, respectively, the summed outputs from FIG. 7b.

Figure 7A:
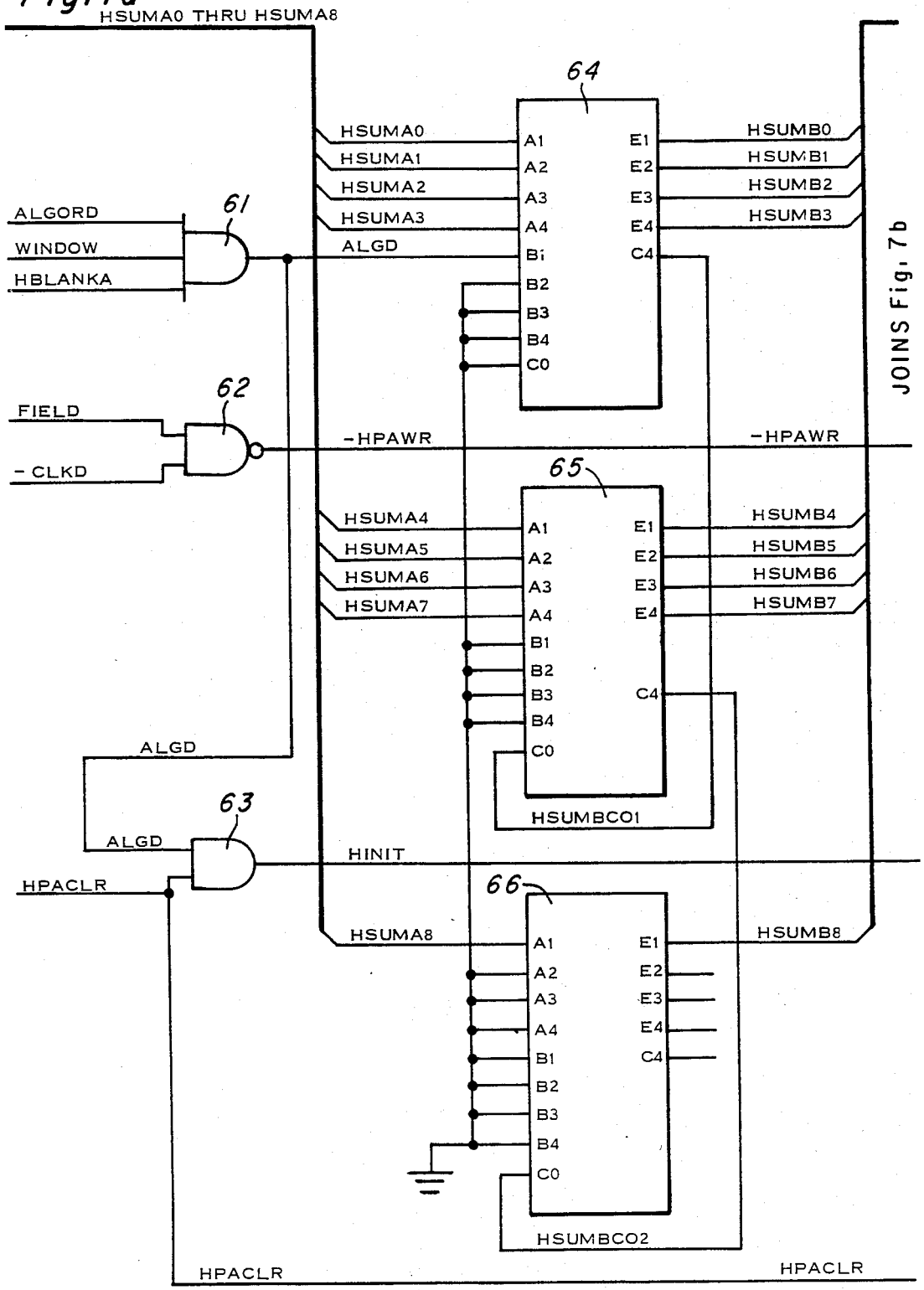
Figure 8D:
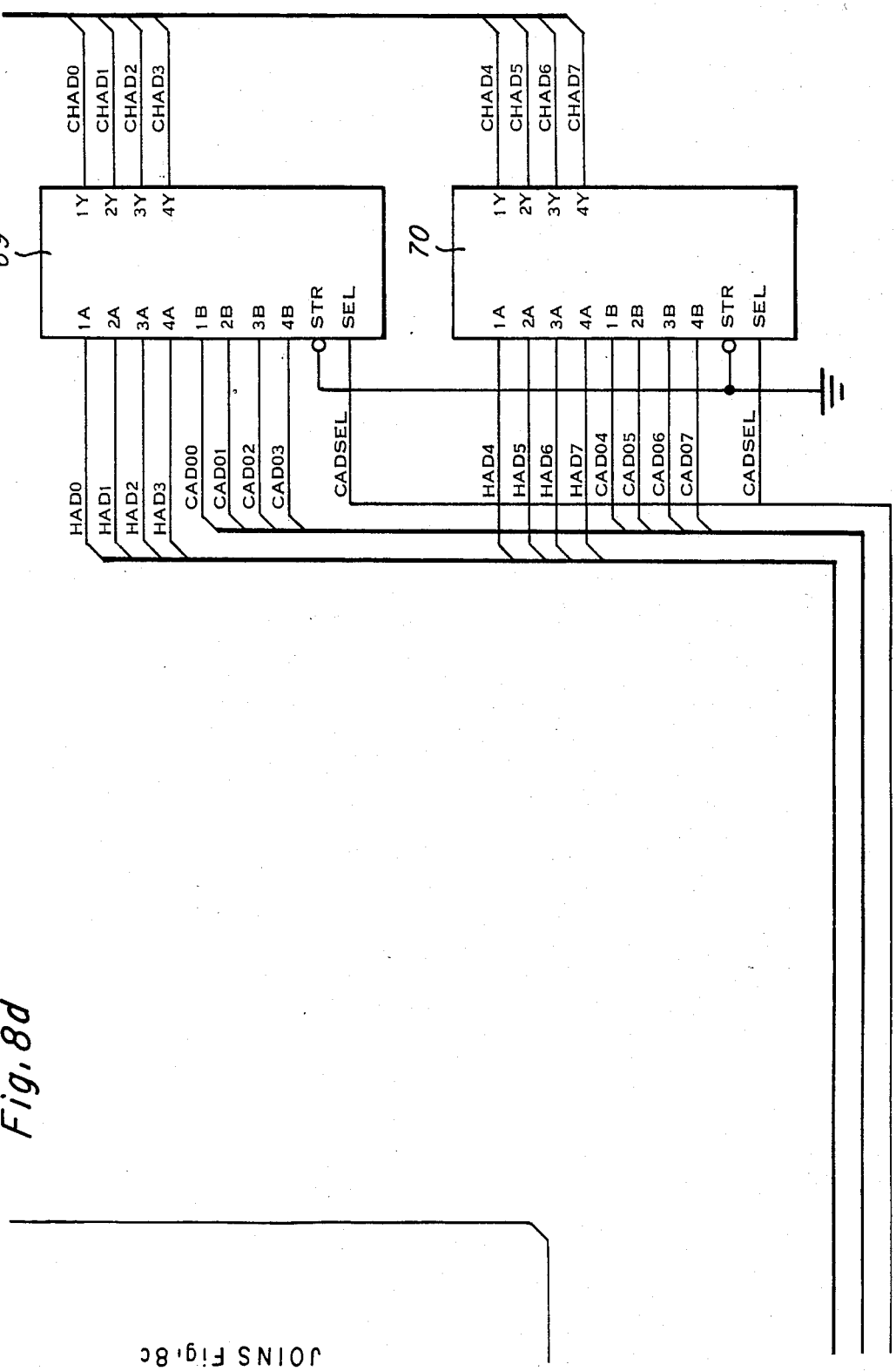

FIGS. 7a and 7b illustrate the horizontal pixel accumulator sum and initialization circuitry. The initialization is accomplished through octal buffer 69, a Texas Instruments type SN74S241, in this preferred embodiment. Signal ALGORD, the stream of pixels from real-time image processing hardware 16, provides one input to AND gate 61. A second input is provided by the signal WINDOW, from the VCPU. The third input to AND gate 61 is provided by the signal HBLANKA, an output from flipflops 44. The output of AND gate 61 is signal ALGD which is combined with signal HPACLR, an output from flipflops 44 in AND gate 63 to provide signal HINIT. When an image pixel is present, then signal ALGD is a "1" and the output signal HINIT is therefore a "1" when signal HPACLR is present. Note that the inputs 1A2-1A4 and 2A1-2A4 of buffer 69 are all tied to ground. Only input 1A1 supplied by signal HINIT is not grounded. Therefore signal HCNT0 is the only output from buffer 69 with signals HCNT1-HCNT7 being zero. This provides initialization of the horizontal accumulator with either a "0" or a "1". Signal HPACLR is applied to terminal 2G and the inversion of HPACLR is applied to terminal −1G, enabling buffer 69. At the same time, signal HPACLR is applied to the −0C terminal of latch circuit 67, disabling it. The outputs from the buffer 69 and latch circuit 67 are tied together but there is no output from latch 67 when buffer 69 is active. Therefore, initially, only the signal HINIT makes an impact on the output. Signal HPACLR gates inverter 71 whose output is signal HCNT8 and whose input is ground thereby providing a zero output for signal HCNT8 when HPACLR is present. Output signals HCNT0-HCNT8 are applied as data inputs to RAMs 49-57. In this initial case, signals HCNT1-HCNT8 are all zero and signal HCNT0 is a "1" or a "0" depending upon the state of signal HINIT.

After this clearing and initialization, the adders 64 and 65 become effective. These adders are Texas Instruments type SN74S283, in this preferred embodiment. Signals HSUMA0-HSUMA3 are applied as inputs to be summed in adder 64. Signals HSUMA4-HSUMA7 are applied as inputs to be summed in adder 65. Signal HSUMA8 is applied as an input to be added to the contents of adder 66. Summed signals are HSUMB0-HSUMB3 from adder 64, signals HSUMB4-HSUMB7 from adder 65 and signal HSUMB8 from adder 66, all of which signals are applied as inputs to latch circuit 67. Signal −HPAWR from NAND gate 62 is applied to the −EN input of latch circuit 67 which gates the individual latches. Signal HSUMB8 is handled in exactly the same manner through another latch circuit 68.

Turning now to FIGS. 8a-8d, the vertical pixel accumulator memory is shown. It is identical to the horizontal pixel accumulator memory except that there is one less RAM. The RAMs 61-68 provide outputs VSUMA0-VSUMA7, respectively in response to address inputs CHAD0-CHAD8. Signals CAD00-CAD07 from the CPU 18 provide address inputs to selectors 69 and 70, as in the horizontal pixel accumulator. Signal CADSEL selects CAD00-CAD07 for transmission to VCPU 18. Otherwise, signals HAD0-HAD7 are selected through selectors 69 and 70 and output from those selectors as signals CHAD0-CHAD7. Signal CHAD8 is handled separately through selector 89 shown in FIG. 10.

Signal −EPAWR from NAND gate 73 is applied to the −WR terminal of each of RAMs 61-68. Data in is supplied through signals VCNT0-VCNT7 from FIG. 9.

Figure 9B:
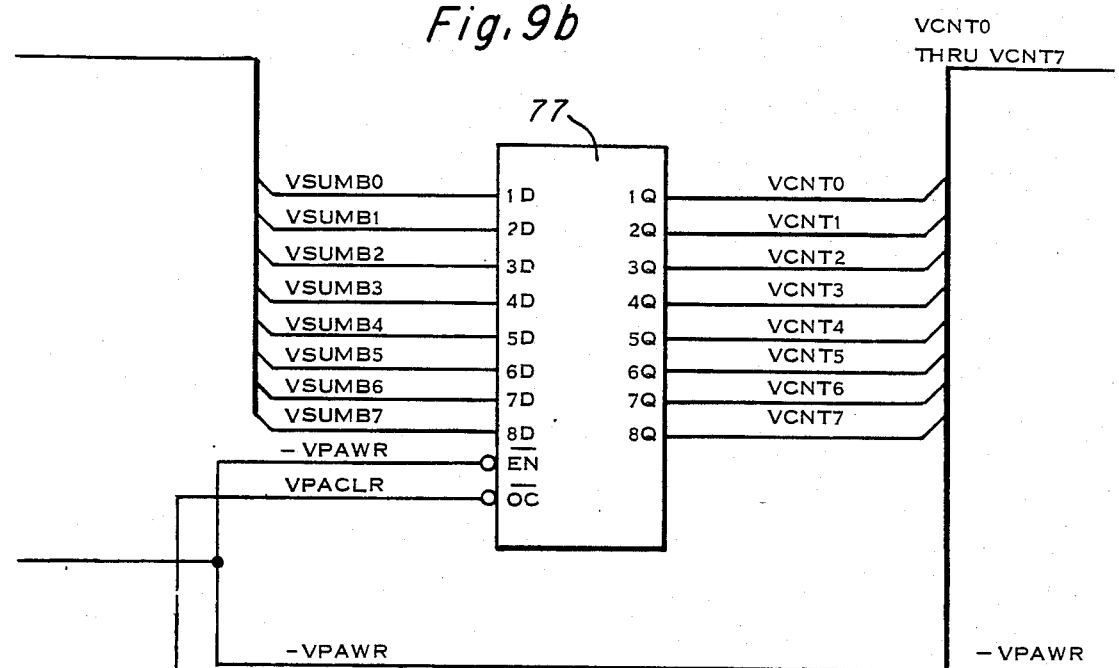
Figure 9B:
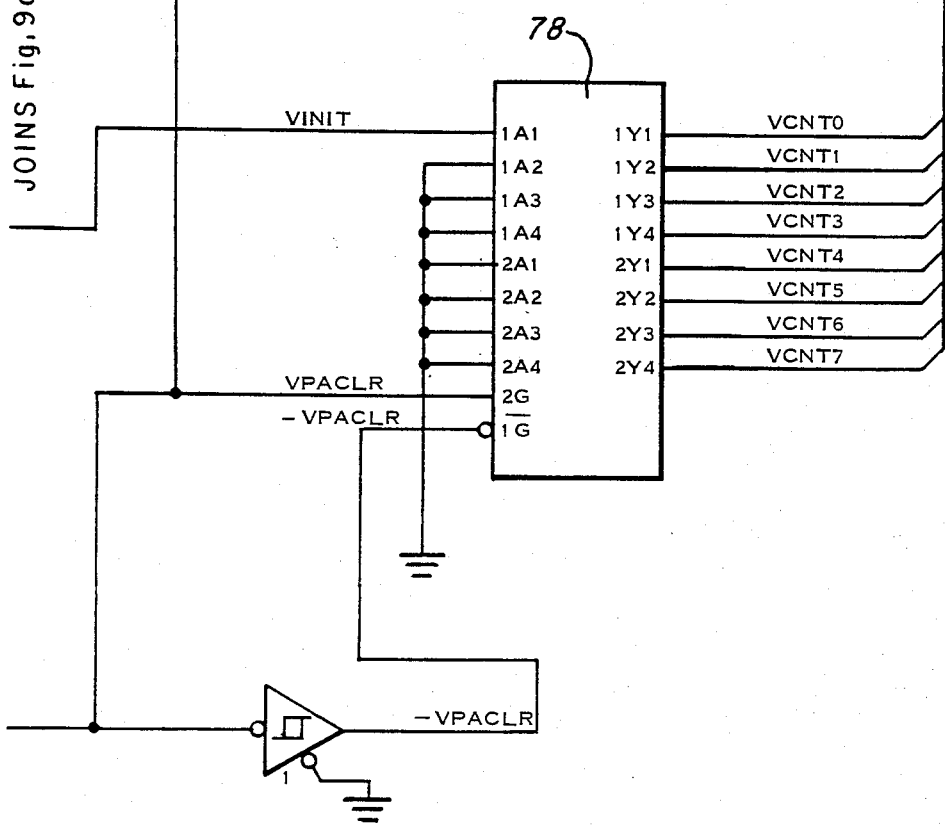

FIGS. 9a and 9b illustrate the vertical pixel accumulator sum and initialization circuitry. It is essentially identical to the horizontal circuitry described earlier. That is, the initialization is done through buffer 78 to provide an output signal VCNT0 equal to 1 or 0, dependent upon input signal ALGORE, the pixel train which provides one input to NAND gate 72. The other two inputs are provided by the signals WINDOW and HBLANKA. When signal VPACLR is present at AND gate 74, together with signal ALGE, then signal VINIT is present and applied to buffer 78. Signal VPACLR which is derived from the flipflops 43, provides the gating input for buffer 78 and the −OC input for flipflop array 77. Signal −VPAWR provides the −EN input to flipflop array 77. Signal VPACLR is inverted through inverter 90 and provides the −1G input to buffer 78, all similar to the horizontal pixel circuitry.

Figure 10A:
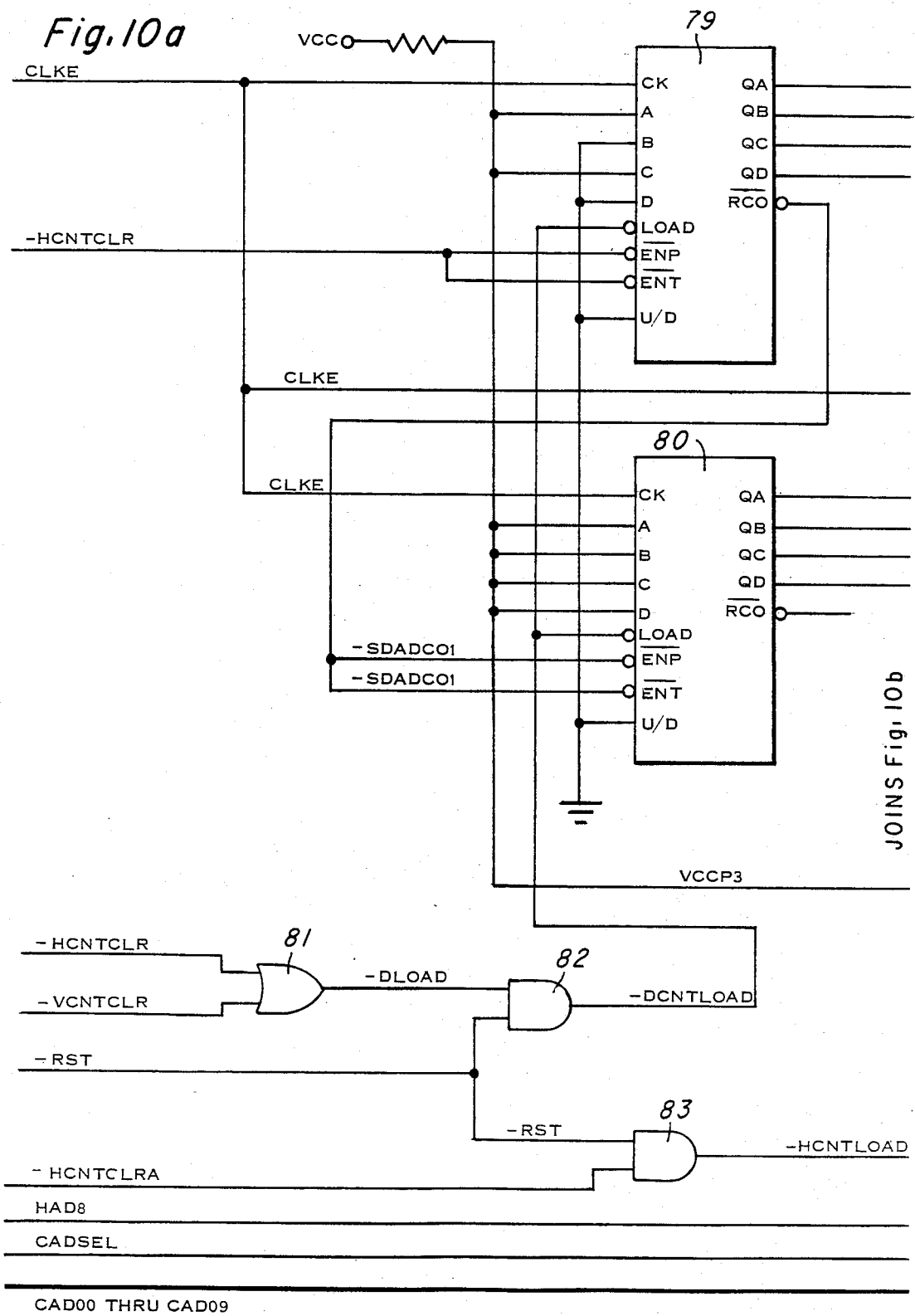
Figure 10B:
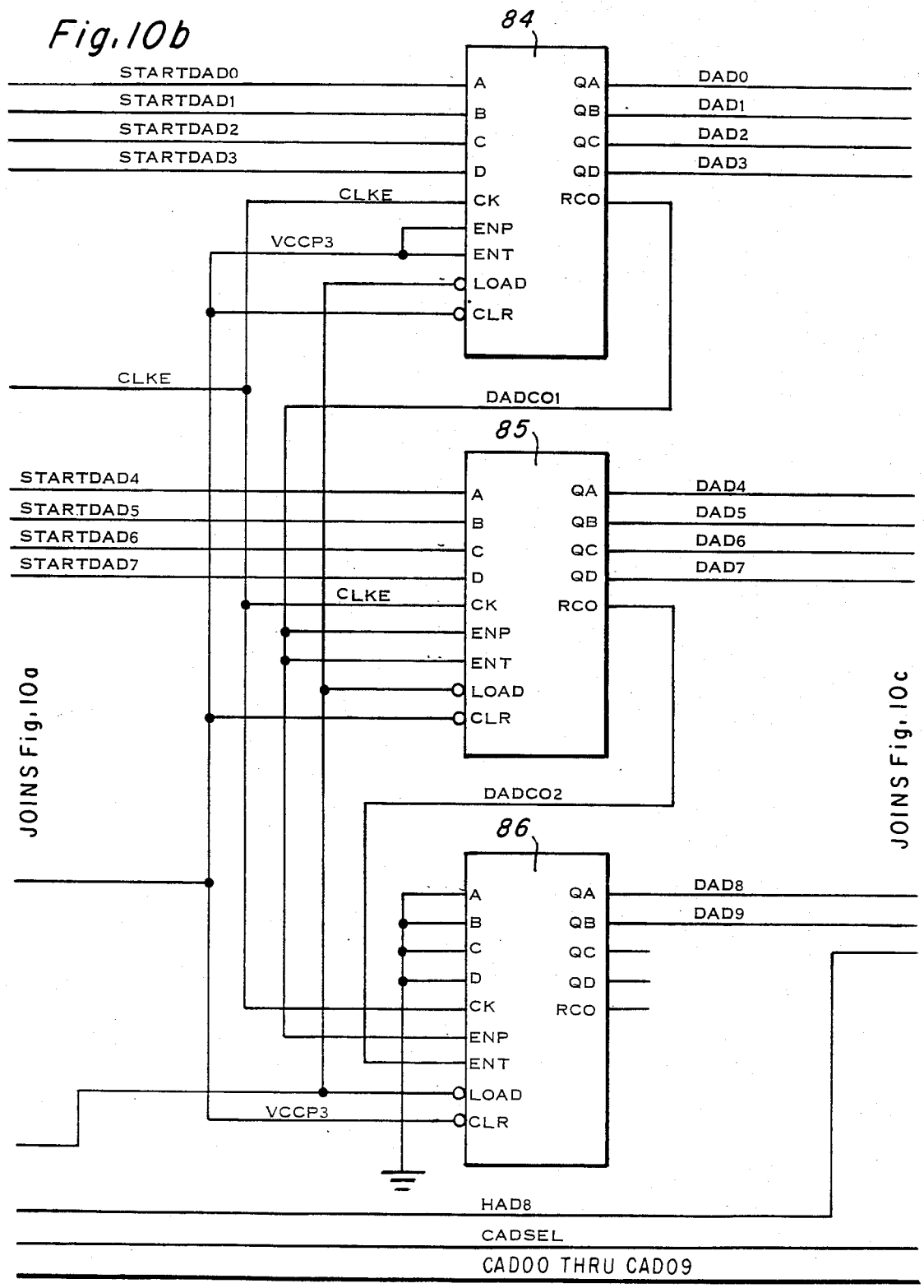

Counters 75 and 76 are provided with signals VSUMA0-VSUMA3 providing inputs to be summed with signal ALGE to adder 75. Signals VSUMA4-VSUMA7 are input to adder 76. Outputs VSUMB0-VSUMB3 from adder 75 and signals VSUMB4-VSUMB7 from adder 76 are input to flipflop array 77 with outputs VCNT0-VCNT7 being connected with the like outputs from buffer 78. When the first vertical line of pixels is to be accumulated, the initialization procedure by way of signal VINIT sets output VCNT0 to a "1" or to a "0", depending upon the state of the image. Outputs VCNT1-VCNT7 from buffer 78 are always zero. When buffer 78 is enabled, the output of flipflop array 77 is disabled, and vice versa so that when the next pixel in a vertical line is to be counted, the output of flipflop array 77 is significant. The various sums represented provide the data in to the RAMs 61-68 of FIGS. 8a-8d. FIGS. 10a-10c represent the diagonal address generator. Although similar to the horizontal and vertical circuitry, there are some outstanding differences. Subtractors 79 and 80 are provided. These are up/down counters of Texas Instruments, type 74LS669. Voltage VCC is dropped across resistor R1 and then applied to inputs A and C of subtractor 79 and to inputs A,B,C, and D of subtractor 80. Inputs B and D of subtractor 79 are grounded. This particular combination represents an input of 245. That starting address is the address of the first diagonal line that passes through the upper left corner of the image plane since the upper left pixel is the first pixel in the serial stream. The reason that the number 245 is selected rather than zero is to preclude the difficulty of dealing with negative numbers. That is, the diagonal lines to the left of this starting line would necessarily be represented as negative numbers if zero were chosen for the starting address.

The U/D terminal of both counters 79 and 80 are connected to ground causing them to count down. Inputs −ENP and −ENT are provided by signal −HCNTCLR, which must be zero to enable the counter 79 to count. The borrow output of counter 79 provides the inputs for terminals ENP− and ENT− of counter 80. Clocking is provided by signal CLKE which is the system clock inverted. The output signals STARTDAD0-STARTDAD7 from counters 79 and 80 provide inputs to counters 84 and 85. Counter 86 has its ENP terminal tied to the carry out terminal of counter 84 which also provides both the ENP and ENT terminals of counter 85 with inputs. Counters 84-86 are Texas Instruments type 74S163. Both inputs ENP and ENT must be high to enable counting. Voltage VCC applies to ENP and ENT inputs to counter 84, assuring that that counter will continuously count. Clock CLKE provides the clock input to the counters 84-86. Terminal ENT of counter 86 has its input provided by the output from the carry out terminal of counter 85. Counter 84 therefore produces output signals DAD0-DAD3; counter 85 produces output signals DAD4-DAD7; counter 86 provides output signals DAD8 and DAD9.

As in the horizontal and vertical circuits, the VCPU 18 provides addresses CAD00-CAD09, CAD00-CAD03 being applied to selector 87, signals CAD0-

4-CAD07 being applied to selector 88; CAD08 and CAD09 being applied to selector 89. The selection signal CADSEL from the VCPU 18 is provided for transmission to the computer memory. As mentioned earlier, signal HAD8 provides an input to selector 89 and provides the output signal CHAD8. Signals DAD0-DAD3 provide inputs to selector 87; signals DAD4-DAD7 provide inputs to selector 88; signals DAD8 and DAD9 provide inputs to selector 89. The output signals are CDAD0-CDAD9 which provide the address inputs to RAMs 91-98 shown in FIGS. 11a-11c.

Signals −HCNTCLR and −VCNTCLR, from the control circuits provide inputs to OR gate 81 which provides signal −DLOAD. VCPU 18 provides signal −RST. Signals −DLOAD and −RST provide inputs to AND gate 82 whose output signal, −DCNTLOAD, provides the −LOAD inputs for up/down counters 79 and 80.

Signal −HCNTCLRA from the control circuit and signal −RST provide inputs to AND gate 83 whose output signal. −HCNTLOAD provides the input to the LOAD terminals of counters 84, 85 and 86.

Figure 11A:
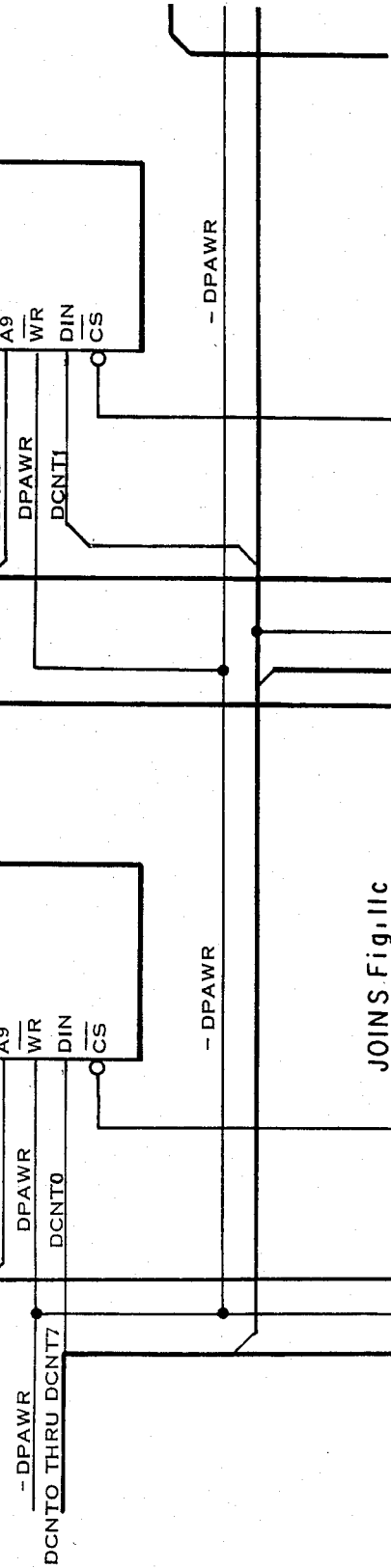

FIGS. 11a-11c illustrate the RAMs 91-98 for the diagonal pixel accumulator memory. These RAMs are identical to those used in the horizontal and vertical circuitry using, of course, different inputs. The input addresses CDAD0-CDAD9 are applied to each of RAMs 91-98 with a resultant output of signals DSUMA0-DSUMA7 respectively. Signal −DPAWR provides the input for the −WR terminal of each of RAMs 91-98. The data in is supplied by signals DCNT0-DCNT7 to each of the RAMs 91-98, respectively.

FIGS. 12a-12c illustrates the diagonal pixel accumulator sum and initialization circuitry. This circuitry is essentially the same as that employed in the horizontal and vertical circuits. Data stream ALGORF, WINDOW signal and HBLANKA signal provide the inputs to AND gate 101, providing output signal ALGF. Signal DPACLR from OR gate 47 of FIG. 5b is anded with signal ALGF through AND gate 103 providing output signal DINIT. Signal DINIT is applied to the 1A1 input of buffer 107 whose other inputs are all grounded. The output is enabled by signal DPACLR being applied to terminal 2G and the inversion of DPACLR being applied to terminal −1G. Signal DPACLR provides the −OC input to flipflop array 106, holding the outputs off when in the "1" state. Signal −DPAWR is applied to the −EN terminal of flipflop array 106 so that, as before with respect to the horizontal and vertical circuits, when buffer circuit 107 is active, flipflop array circuit 106 is inactive and vice versa. The initial signal DCNT0, whether a "1" or a "0" is then entered into RAM 91 while all other input signals DCNT1-DCNT7 are zero. After the initial entry, the sums are updated and output through flipflop array 106 back to the RAMs 91-98.

PREFERRED MODE OF OPERATION

TV camera 11 of FIG. 1 is commanded, by VCPU 18, to take a picture whose image is then immediately serially transferred into interface electronics 15. Interface electronics 15 digitizes and identifies the digitized signals as pixels of the image to be counted or simply background pixels which are not to be counted. This serial train of identifiable pixels is transferred into the real time image processing hardware 16 for area, perimeter and edge identification and also transmitted into the real-time data accumulation hardware 17. Referring to FIGS. 4a and 4b a VSICLK operates, in this preferred embodiment, at eight Mhz and is used to clock the horizontal address generators 31-33. VADCLK operates at a lower frequency, depending upon the number of columns of pixels. In this preferred embodiment, there are 432 columns of pixels so that this total number of columns is traversed before clock signal VADCLK operates.

Referring to FIGS. 5a and 5b the address as VAD0-VAD8 and HAD0-HAD8 provides various control signals, described above. These control signals then are used to control the operations of the counters, adders and RAMS of the accumulation circuitry. In FIGS. 4a and 4b, VCPU 18 provides the initial addressing for both the horizontal generators 31-33 and the vertical generators 34-36. Those outputs then set up the various control signals as shown in FIGS. 5a and 5b. Address signals VAD0-VAD7 also provide inputs to the selectors 58 and 59 of FIGS. 6a-6d which then select an address for RAMs 49-57. The word at that address is applied to adders 64-66 of FIGS. 7a and 7b. An addition is made to the incoming pixel stream but for the very first pixel, the addition is not permitted to reenter the memory. Instead, an initialization is made through buffer 69 by way of input signal HINIT as described earlier. That is, in the very first address, output line buffer 69 is zero except for output signal HCNT0 which may be a one or a zero depending upon whether the first pixel is a one or zero. Then those signals are entered into the RAMs 49-57, respectively. This amounts to entering all zeros at the selected address except for RAM 49 which may be set to a one, depending upon the state of the corresponding pixel.

The next pixel in the horizontal line is then added to the contents at that address until the end of the line is reached at which time a new horizontal line is to be summed, requiring another initialization as indicated above.

At the same time, a vertical pixel accumulator is operating, in much the same manner. That is as each new vertical line is reached for summing, an initialization is performed through buffer 78 of FIGS. 9a and 9b in exactly the same manner as described for the horizontal initialization. The signals are, of course, different. However, in the same manner, after each initialization, the individual pixels are summed in the vertical columns.

Finally, with respect to the diagonal line pixel counting apparatus, reference should be made to FIGS. 10a and 10b. As described earlier, an initial entry of 245 is made for the subtractors 79 and 80. That input provides the starting count for counters 84-86. As those counters count to the end of the horizontal row of pixels, a new horizontal row at a different vertical address is started.

Signal −HCNTCLR, from PROM 42, as determined by a proper combination of HD0-HD8 addresses, is present to cause the up/down counters 79 and 80 to decrement by one. Then the starting count for counters 84-86 is decreased by one each time that a horizontal row is completed. The up/down counters are decremented by one until the bottom left corner of the frame is reached at output zero from the up/down counters 79 and 80.

With reference to FIGS. 11a-11c and 12a-12c, the initialization for new diagonal lines is done in exactly the same manner, using different signals, as for the vertical and horizontal accumulators. The addressing is accomplished in the same manner as well as the accessing of the memories. A final result, as indicated in FIG. 3 in graphic form, is to provide a pixel count in the horizontal, vertical and diagonal directions for further processing to determine identity and orientation of the article whose picture was taken. This information is of extreme importance to those systems that involve vision aided robots to provide the robots with "sight".

The gist of this invention is to provide, in a video data accumulation system, a pixel count in real time for the horizontal, vertical and diagonal directions. Obviously, many circuits can be devised to accomplish this purpose. These engineering choices are contemplated by the appended claims.

What is claimed is:

1. A method of acquiring video data in a video data acquisition system having a video camera for forming an image of an article wherein a serial stream of data from the video camera is digitized, and the signal selected within a predetermined amplitude range as representations of pixels arranged in rows, columns and diagonal lines, comprising the steps of:
   (a) counting, in real time, and storing pixels that appear in each row of the image;
   (b) counting, in real time, and storing signals that appear in each column of the image; and
   (c) counting, in real time, and storing pixels that appear in each diagonal line of the image.

2. A method of claim 1 further comprising the steps of, after each of steps (a), (b) and (c) respectively;
   clearing the number of pixels previously counted in a row of pixels when the current number of pixels in that row is to be counted;
   clearing the number of pixels previously counted in a column of pixels when the current number of pixels in that column is to be counted;
   clearing the number of pixels previously counted in a diagonal line of pixels when the current number of pixels in that diagonal line is to be counted.

3. A method of acquiring video data in a video data acquisition system having a video camera for forming an image of an article wherein a serial stream of data from the video camera is digitized, and the signal selected within a predetermined amplitude range as representations of pixels arranged in rows, columns and diagonal lines, comprising the steps of:
   (a) counting, in real time, and storing pixels that appear in each row of the image;
   (b) clearing the number of pixels previously counted in a row of pixels when the current number of pixels in that row is to be counted;
   (c) counting, in real time, and storing signals that appear in each column of the image;
   (d) clearing the number of pixels previously counted in a column of pixels when the current number of pixels in that column is to be counted;
   (e) counting, in real time, and storing pixels that appear in each diagonal line of the image by starting the count of diagonal lines at a predetermined number and decreasing the predetermined number by one each time a row of pixels is counted; and
   (f) clearing the number of pixels previously counted in a diagonal line of pixels when the current number of pixels in that diagonal line is to be counted.

4. A video data acquisition system having a video camera for forming an image of an article, adapted to acquire, digitize and select signals within a predetermined amplitude range as representations of pixels of the image arranged in rows, columns and diagonal lines from a serial stream of signals from the camera, comprising:
   (a) horizontal pixel collection means for counting, in real time, and storing pixels that appear in each row of the image;
   (b) vertical pixel collection means for counting, in real time, and storing pixels that appear in each column of the image; and
   (c) diagonal pixel collection means for counting, in real time, and storing pixels that appear in each diagonal line of the image.

5. The system of claim 4 wherein the diagonal pixel collection means comprises diagonal pixel accumulator memory means for storing the sum of each diagonal line of pixels.

6. The system of claim 5 wherein the diagonal pixel collection means further comprises diagonal address generator means for providing addresses of the diagonal lines of pixels stored in the diagonal pixel accumulator memory means.

7. The system of claim 6 wherein the diagonal pixel collection means further comprises summing means for counting, in real time, the number of pixels in each diagonal line of pixels.

8. The system of claim 7 wherein the diagonal pixel collection means further comprises means for clearing the number of pixels previously counted in a diagonal line of pixels when the current number of pixels in that diagonal line is to be counted.

9. The system of claim 5 wherein the diagonal pixel accumulator memory means comprises a random access memory.

10. The system of claim 4 wherein the horizontal pixel collection means comprises horizontal pixel accumulator memory means for storing the sum of each row of pixels.

11. The system of claim 8 wherein the horizontal pixel collection means comprises horizontal pixel accumulator memory means for storing the sum of each row of pixels.

12. The system of claim 10 wherein the horizontal pixel collection means further comprises horizontal address generator means for providing addresses of the rows of pixels stored in the horizontal pixel accumulator memory means.

13. The system of claim 11 wherein the horizontal pixel collection means further comprises horizontal address generator means for providing addresses of the rows of pixels stored in the horizontal pixel accumulator memory means.

14. The system of claim 12 wherein the horizontal pixel collection means further comprises summing means for counting, in real time, the number of pixels in each row of pixels.

15. The system of claim 13 wherein the horizontal pixel collection means further comprises summing means for counting, in real time, the number of pixels in each row of pixels.

16. The system of claim 14 wherein the horizontal pixel collection means further comprises means for clearing the number of pixels previously counted in a row when the current number of pixels in that row is to be counted.

17. The system of claim 15 wherein the horizontal pixel collection means further comprises means for clearing the number of pixels previously counted in a row when the current number of pixels in that row is to be counted.

18. The system of claim 4 wherein the vertical pixel collection means comprises vertical pixel accumulator memory means for storing the sum of each column of pixels.

19. The system of claim 8 wherein the vertical pixel collection means comprises vertical pixel accumulator memory means for storing the sum of each column of pixels.

20. The system of claim 12 wherein the vertical pixel collection means comprises vertical pixel accumulator memory means for storing the sum of each column of pixels.

21. The system of claim 18 wherein the vertical pixel collection means further comprises vertical address generator means for providing addresses of the columns of pixels stored in the vertical pixel accumulator memory means.

22. The system of claim 19 wherein the vertical pixel collection means further comprises vertical address generator means for providing addresses of the columns of pixels stored in the vertical pixel accumulator memory means.

23. The system of claim 20 wherein the vertical pixel collection means further comprises vertical address generator means for providing addresses of the columns of pixels stored in the vertical pixel accumulator memory means.

24. The system of claim 21 wherein the vertical pixel collection means further comprises summing means for counting, in real time, the number of pixels in each column of pixels.

25. The system of claim 22 wherein the vertical pixel collection means further comprises summing means for counting, in real time, the number of pixels in each column of pixels.

26. The system of claim 23 wherein the vertical pixel collection means further comprises summing means for counting, in real time, the number of pixels in each column of pixels.

27. The system of claim 24 wherein the vertical pixel collection means further comprises means for clearing the number of pixels previously counted in a column of pixels when the current number of pixels in that column is to be counted.

28. The system of claim 26 wherein the vertical pixel collection means further comprises means for clearing the number of pixels previously counted in a column of pixels when the current number of pixels in that column is to be counted.

29. The system of claim 27 wherein the vertical pixel collection means further comprises means for clearing the number of pixels previously counted in a column of pixels when the current number of pixels in that column is to be counted.

30. A video data acquisition system having a video camera for forming an image of an article, adapted to acquire, digitize, and select signals within a predetermined amplitude range as representations of pixels of the image arranged in rows, columns, and diagonal lines from a serial stream of signals from the camera, comprising:
(a) horizontal pixel collection means for counting, in real time, and storing pixels that appear in each row of the image;
(b) vertical pixel collection means for counting, in real time, and storing pixels that appear in each column of the image; and
(c) diagonal pixel collection means for counting, in real time, and storing pixels that appear in each diagonal line of the image wherein the diagonal pixel collection means comprises a random access memory for storing the sum of each diagonal line of pixels, and further including diagonal address generator means for providing addresses of the diagonal lines of pixels stored in the diagonal pixel accumulator memory means, wherein the diagonal address generator means comprises subtraction means having a predetermined initial output, and counting means, connected to receive the output of the subtraction means and to to a count predetermined number of addresses of the diagonal lines of pixels to cause the subtraction means to decrement to the predetermined initial output.

31. The system of claim 30 wherein the diagonal pixel collection means further comprises summing means for counting, in real time, the number of pixels in each diagonal line of pixels.

* * * * *